(12) United States Patent
Mao

(10) Patent No.: US 12,548,103 B2
(45) Date of Patent: Feb. 10, 2026

(54) ITINERARY INFORMATION PROMPTING METHOD AND ELECTRONIC DEVICE

(71) Applicant: Beijing Honor Device Co., Ltd., Beijing (CN)

(72) Inventor: Lu Mao, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 147 days.

(21) Appl. No.: 18/285,310

(22) PCT Filed: May 5, 2022

(86) PCT No.: PCT/CN2022/091013
§ 371 (c)(1),
(2) Date: Oct. 2, 2023

(87) PCT Pub. No.: WO2023/010917
PCT Pub. Date: Feb. 9, 2023

(65) Prior Publication Data
US 2024/0185373 A1 Jun. 6, 2024

(30) Foreign Application Priority Data
Jul. 31, 2021 (CN) .......................... 202110877382.6

(51) Int. Cl.
*G06Q 50/40* (2024.01)
*G06Q 10/02* (2012.01)
(Continued)

(52) U.S. Cl.
CPC .............. *G06Q 50/40* (2024.01); *G06Q 10/02* (2013.01); *G06Q 10/025* (2013.01); *G07C 9/215* (2020.01);
(Continued)

(58) Field of Classification Search
CPC ...... G06Q 50/40; G06Q 10/02; G06Q 10/025; G07C 9/22; G07C 9/27; G07C 9/28; G07C 9/215; G07C 2209/08; H04W 4/021
See application file for complete search history.

(56) References Cited

U.S. PATENT DOCUMENTS

2011/0022668 A1 1/2011 Shih et al.
2011/0082714 A1* 4/2011 Gaikwad ................ G06Q 10/02
705/5
(Continued)

FOREIGN PATENT DOCUMENTS

CN 106100977 A 11/2016
CN 108389028 A 8/2018
(Continued)

OTHER PUBLICATIONS

Vigeland, Eirik, Høisæther, Øyvind, "Context-awareness for Mobile Ticketing Systems", 2014, Norwegian University of Science and Technology, Department of Computer and Information Science (Year: 2014).*

(Continued)

*Primary Examiner* — Jeff Zimmerman
*Assistant Examiner* — Wayne S. Murray
(74) *Attorney, Agent, or Firm* — WOMBLE BOND DICKINSON (US) LLP

(57) ABSTRACT

This application relates to the field of terminal technology, and provides an itinerary information prompting method and an electronic device to reduce the difficulty for a user to obtain itinerary information during railway travel and provide travel convenience. The electronic device may detect a current stage of an itinerary. Subsequently, the electronic device may prompt the user with itinerary information that matches the stage of the itinerary. The information that matches the stage of the itinerary is the information to be urgently needed by the user at this stage of the itinerary.

20 Claims, 23 Drawing Sheets

(51) Int. Cl.
  *G07C 9/20* (2020.01)
  *G07C 9/22* (2020.01)
  *G07C 9/27* (2020.01)
  *G07C 9/28* (2020.01)
  *H04W 4/021* (2018.01)

(52) U.S. Cl.
  CPC .............. *G07C 9/22* (2020.01); *G07C 9/27* (2020.01); *G07C 9/28* (2020.01); *G07C 2209/08* (2013.01); *H04W 4/021* (2013.01)

(56) References Cited

U.S. PATENT DOCUMENTS

| | | | |
|---|---|---|---|
| 2016/0086228 A1* | 3/2016 | Babb | G06Q 30/0243 705/14.64 |
| 2017/0124550 A1* | 5/2017 | Oberli | G06Q 50/40 |
| 2017/0322690 A1* | 11/2017 | Chen | H04L 67/53 |
| 2019/0230215 A1 | 7/2019 | Zhu et al. | |
| 2021/0227069 A1 | 7/2021 | Zhu et al. | |

FOREIGN PATENT DOCUMENTS

| | | |
|---|---|---|
| CN | 112333240 A | 2/2021 |
| CN | 112419688 A | 2/2021 |
| CN | 112766912 A | 5/2021 |

OTHER PUBLICATIONS

Kazi, S., M. Bagasrawala, F. Shaikh and A. Sayyed, "Smart E-Ticketing System for Public Transport Bus," 2018, International Conference on Smart City and Emerging Technology (ICSCET), Mumbai, India, 2018, pp. 1-7 (Year: 2018).*

* cited by examiner

ITINERARY INFORMATION PROMPTING METHOD AND ELECTRONIC DEVICE

CROSS-REFERENCE TO RELATED APPLICATIONS

This application is a national stage of International Application No. PCT/CN2022/091013, filed on May 5, 2022, which claims priority to Chinese Patent application Ser. No. 20/2110877382.6, filed on Jul. 31, 2021. The disclosures of both of the aforementioned applications are hereby incorporated by reference in their entireties.

TECHNICAL FIELD

This application relates to the field of terminal technology, in particular to, an itinerary information prompting method and an electronic device.

BACKGROUND

In China, railway travel is a safe and reliable way of travel. Numerous users prefer to travel by rail when traveling long distances.

However, in a process of implementing an embodiment of this application, the applicant hereof detects at least the following problems in the existing railway travel: throughout an itinerary from arriving at a departure railway station to exiting a destination station, the user is required to take out his/her ID card many times for scanning, or the user is required to take out a mobile phone many times and perform a plurality of steps to obtain desired information, for example, information about a carriage and a seat number to be queried in a ticket booking app (Application, APP). This makes it very inconvenient to obtain the itinerary information during the whole itinerary.

SUMMARY

This application provides an itinerary information prompting method and an electronic device to reduce the difficulty for a user to obtain itinerary information during railway travel and improve efficiency of human-computer interaction.

According to a first aspect, an embodiment of this application provides an itinerary information prompting method. The method is applicable to electronic devices such as a mobile phone. An app that provides a railway ticket booking function (briefly known as a booking app) is installed on the electronic device. After a ticket is purchased on the booking app, the method further includes: prompting, by the electronic device, first information when the electronic device arrives at a departure station of a first itinerary, where the first information includes train number information of the first itinerary, departure time of the first itinerary, and/or check-in time of the first itinerary. In this way, after the user arrives at the train station, the electronic device can prompt the user with information such as the train number, departure time, and/or check-in time. The method further includes: prompting, by the electronic device, second information when itinerary status of the first itinerary is a first state, where the first state is used for indicating that a user corresponding to the first itinerary has entered the station through security check, and the second information includes check-in counter information of the first itinerary. In this way, the electronic device can prompt the user with the check-in counter information after the user completes the security check and enters a waiting hall. The method further includes: displaying, by the electronic device, an e-ticket of the first itinerary in response to a first operation performed by the user on the second information, where the e-ticket is used for check-in at the station. In this way, upon the user performing the first operation on the second information, the electronic device can display and provide the e-ticket to the user. The method further includes: prompting, by the electronic device, third information after the itinerary status of the first itinerary is updated to a second state, where the second state is used for indicating that the e-ticket has been checked in at the station, and the third information includes carriage information and seat number information. In this way, the electronic device can prompt the user with information such as the carriage and seat number after completion of check-in. The method further includes: prompting, by the electronic device, fourth information when the electronic device arrives at a destination station of the first itinerary, where the fourth information is used for prompting the user to access the e-ticket for check-out from the station; and displaying, by the electronic device, the e-ticket in response to a second operation performed by the user on the fourth information, where the e-ticket is used for check-out from the station. In this way, after the user arrives at the destination station, the electronic device can provide the user with a quick access to an e-ticket for check-out from the station.

To sum up, by applying the method according to this embodiment of this application, the electronic device can detect the current stage of the itinerary in the process from arriving at the departure station to arriving at and exiting the destination station. Subsequently, the electronic device may prompt the user with itinerary information that matches the stage of the itinerary. The information that matches the stage of the itinerary is the information to be urgently needed by the user at this stage of the itinerary. For example, in a waiting stage after the user enters the station through the security check, the information desired by the user is the check-in counter information. The electronic device prompts the user with the check-in counter information when detecting that the current stage is a waiting stage. Moreover, a mobile phone can quickly display the e-ticket in response to an operation performed by the user on the prompted itinerary information. In this way, it is convenient for the user to obtain the itinerary information (including the e-ticket) most desired at each stage of the itinerary, thereby reducing the difficulty for the user to obtain the itinerary information, and providing travel convenience.

In a possible design of the first aspect, the third information further includes platform information. The platform information is used for indicating a boarding platform of the first itinerary.

In this way, by applying the method according to this embodiment, the electronic device can prompt the user with the boarding platform after completion of check-in. In this way, it is convenient for the user to quickly find the boarding platform after completion of check-in. Especially, for some railway stations with many platforms or complex locations of the platforms, the effect is more noticeable.

In another possible design of the first aspect, the method includes: displaying, by the electronic device, fifth information through a floating window when the electronic device enters the carriage corresponding to the first itinerary, where the fifth information includes the carriage information and the seat number information. The floating window may be displayed in any interface currently displayed on the mobile phone. For example, if the main interface is currently being displayed, the floating window may be displayed in the main interface. If the leftmost home screen interface is currently being displayed, the floating window may be displayed in the leftmost home screen interface.

In this way, by applying the method according to this embodiment, the electronic device can prompt the user with the carriage information and the seat number information in the floating window after the user enters the carriage. In this way, the electronic device can display the carriage number and seat number to the user at any time during the travel so that the user can quickly find the seat after leaving the seat.

In another possible design of the first aspect, the method includes: displaying, by the electronic device, the e-ticket in response to a third operation performed by the user on the fifth information, where the e-ticket is used for checking the ticket.

In this way, by applying the method according to this embodiment, the fifth information is still a quick access to the e-ticket. In this way, the user can quickly access the e-ticket for in-transit ticket inspection.

In another possible design of the first aspect, that the electronic device arrives at a departure station of a first itinerary includes: a current location of the electronic device is located in a location range of the departure station of the first itinerary in a first preset time period. A start time of the first preset time period is earlier than the departure time of the first itinerary. In addition, the first preset time period is immediately prior to the departure time.

In this way, by applying the method according to this embodiment, the electronic device displays the information such as the train number, departure time, and check-in time when the electronic device arrives at the departure station only within the first preset time period immediately prior to the departure time. In this way, the rationality of prompting the first information is improved, and it can be accurately determined that the user has arrived at the departure station and is about to start the first itinerary. For example, the departure time is 14:00 July 12, and the first preset time period is a time period prior to the departure time in the day of the departure time, then the user travelling to the departure station to send off a relative or friend on July 11 does not intend to start the first itinerary. Because the current time has not reached the first preset time period, the information such as the train number, departure time, and check-in time are not displayed in this case.

In another possible design of the first aspect, the method includes: receiving, by the electronic device, status indication information from a server, where the status indication information is used for indicating itinerary status of the first itinerary; the first indication information is sent by the server to the electronic device after the user of the first itinerary enters the station through security check, and the second indication information is sent by the server to the electronic device after the e-ticket is checked in at the station; or obtaining, by the electronic device, the itinerary status of the first itinerary from the server periodically after the electronic device arrives at the departure station and/or after the check-in time arrives, where the first state is obtained by the electronic device after the user of the first itinerary enters the station through security check, and the second state is sent by the server to the electronic device after the e-ticket is checked in at the station.

In this way, by applying the method according to this embodiment, the mobile phone can obtain the itinerary status of the first itinerary in time, so as to accurately detect the current itinerary stage. For example, if the first state is obtained or the first indication information is received, it indicates that the user has entered the station through security check. For another example, if the second state is obtained or the second indication information is received, it indicates that the check-in is completed. Understandably, after detecting the current itinerary stage, the electronic device may be triggered to prompt the corresponding itinerary information, thereby facilitating the user to obtain the itinerary information desired at each stage.

In another possible design of the first aspect, the server is a server of a 12306™ app.

In this way, by applying the method according to this embodiment, reliable status information can be obtained through an official server.

In another possible design of the first aspect, the second information further includes floor information. The floor information is used for indicating a floor on which the check-in counter of the first itinerary is located.

In this way, by applying the method according to this embodiment, the electronic device can prompt the floor information after the user enters the station through security check, thereby facilitating the user to quickly learn the waiting floor. Especially in a large-scale railway station, the waiting hall usually includes a plurality of floors, and correspondingly, the effect of this technical solution is more noticeable.

In another possible design of the first aspect, the second information further includes a first control. The first control is used for triggering the electronic device to display the e-ticket. The first operation is a tap operation on the first control.

In this way, by applying the method according to this embodiment, the electronic device provides, through the second information, the control to trigger the display of the e-ticket to facilitate the user to access the e-ticket.

In another possible design of the first aspect, the electronic device includes a first sensing model. The first sensing model serves a function of recognizing a place of the electronic device based on an ambient sound, an image acquired by a camera, positioning by a Global Positioning System GPS, positioning by a base station, and/or Wi-Fi fingerprint information. The method further includes: running, by the electronic device, the first sensing model by using the ambient sound, the image acquired by the camera, the positioning by the GPS, the positioning by the base station, and/or the Wi-Fi fingerprint information as an input, so as to output the place of the electronic device. The place is any one of the departure station, the carriage, or the destination station.

In this way, by using the method according to this embodiment, the electronic device can recognize the place of the electronic device through the model. The model can recognize the place with reference to the ambient sound, the ambient image, and positioning techniques of different precisions, thereby improving the accuracy and efficiency of recognition. In addition, the recognized place may be used for the electronic device to detect the current stage of the itinerary. For example, if recognizing that the place is in a carriage, the electronic device detects that the current stage is an in-transit stage.

In another possible design of the first aspect, the fourth information includes destination station information, thereby facilitating the user to confirm arrival at the destination station.

According to a second aspect, an embodiment of this application further provides an itinerary information prompting method. The method is applicable to electronic devices such as a mobile phone. An app that provides a railway ticket booking function (briefly known as a booking app) is installed on the electronic device. After a ticket is purchased on the booking app, the method further includes: prompting, by the electronic device, first information when the electronic device arrives at a departure station of a first itinerary, where the first information includes train number information of the first itinerary, departure time of the first itinerary, and/or check-in time of the first itinerary. In this way, after the user arrives at the train station, the electronic device can prompt the user with information such as the train number, departure time, and/or check-in time. The method further includes: prompting, by the electronic device, second information when itinerary status of the first itinerary is a first state, where the first state is used for indicating that a user corresponding to the first itinerary has entered the station through security check, and the second information includes check-in counter information of the first itinerary. In this way, the electronic device can prompt the user with the check-in counter information after the user completes the security check and enters a waiting hall. The method further includes: displaying, by the electronic device, an e-ticket of the first itinerary in response to a first operation performed by the user on the second information, where the e-ticket is used for check-in at the station.

To sum up, by applying the method according to this embodiment of this application, the electronic device can prompt the user with corresponding itinerary information after completing security check and entering the waiting hall and after arriving at the destination station respectively. Moreover, a mobile phone can quickly display the e-ticket in response to an operation performed by the user on the prompted itinerary information. In this way, it is convenient for the user to obtain the itinerary information (including the e-ticket) most desired at each stage of the itinerary, thereby reducing the difficulty for the user to obtain the itinerary information, and providing travel convenience.

In a possible design of the second aspect, the prompting, by an electronic device, first information includes: displaying, by the electronic device, the first information in at least one of a leftmost home screen interface, a lock screen interface, a main interface, or a floating window; and/or, sending, by the electronic device, the first information to a wearable device connected to the electronic device so that the first information is available for being displayed or played by the wearable device. The prompting, by the electronic device, second information includes: displaying, by the electronic device, the second information in at least one of the leftmost home screen interface, the lock screen interface, the main interface, or the floating window; and/or, sending, by the electronic device, the second information to the wearable device connected to the electronic device so that the second information is available for being displayed or played by the wearable device. The wearable device includes at least one of a bracelet, a smartwatch, or a headset. In addition, third information, fourth information, fifth information, and sixth information may also be prompted in the above form.

In this way, by applying the method according to this embodiment, the electronic device can regularly prompt the itinerary information of each stage in one or more of the above manners. For example, the electronic device always prompts the itinerary information as a leftmost home screen notification in the leftmost home screen interface. In this way, the calculation is simplified, and the user is conveniently accustomed to the regular prompt manner. Alternatively, the itinerary information at different stages may be prompted in different ways so that the prompting manner is adapted to each stage. Alternatively, the itinerary information may be prompted in a corresponding manner depending on the status of the mobile phone. For example, when the screen is off, the itinerary information is prompted in the lock screen interface after the screen lights up. When a headset is connected, the itinerary information is played by the headset. When the app is in use, the itinerary information is prompted in the floating window. Therefore, it is ensured that the itinerary information of each stage is prompted to the user.

In another possible design of the second aspect, that the electronic device arrives at a departure station of a first itinerary includes: a current location of the electronic device is located in a location range of the departure station of the first itinerary in a first preset time period. A start time of the first preset time period is earlier than the departure time of the first itinerary.

In another possible design of the second aspect, the second information further includes floor information. The floor information is used for indicating a floor on which the check-in counter of the first itinerary is located.

In another possible design of the second aspect, the second information further includes a first control. The first control is used for triggering the electronic device to display the e-ticket. The first operation is a tap operation on the first control.

In another possible design of the second aspect, after the electronic device prompts the second information, the method further includes: prompting, by the electronic device, six information when current time reaches start time of a second preset time period, where the sixth information is used for prompting the user to access the e-ticket for check-in at the station, and the start time of the second preset time period is earlier than or equal to the check-in time of the first itinerary; and displaying, by the electronic device, the e-ticket in response to a fourth operation performed by the user on the sixth information, where the e-ticket is used for check-in at the station.

In this way, by applying the method according to this embodiment, the electronic device can prompt the user with the sixth information for the moment or upon arrival of the check-in time, thereby providing the user with a quick access to the e-ticket. It is hereby noted that, when it is detected that the check-in stage is about to come, the electronic device re-prompts the relevant information for the check-in stage, so as to trigger the display of the e-ticket. In this way, it is ensured that the e-ticket can be displayed quickly as triggered. For example, after the user closes the second information, the e-ticket can still be displayed as triggered through the sixth information.

In another possible design of the second aspect, the second information further includes carriage information and seat number information. After displaying the e-ticket of the first itinerary, the method further includes: displaying, by the electronic device, the second information in response to a fifth operation performed by the user on the e-ticket. For example, the e-ticket includes a return control. The fifth operation may be a tap operation on the return control. In this way, it is convenient to continue to prompt the user with the carriage number and seat number after check-in.

In this way, by applying the method according to this embodiment, the second information includes the carriage information and seat number information. Therefore, the electronic device does not need to re-prompt the information such as carriage number and seat number after detecting completion of check-in. Therefore, the detection of the completion of the check-in can be omitted, thereby reducing the calculation and reducing the power consumption of the mobile phone.

In another possible design of the second aspect, after the electronic device prompts the second information, the method further includes: prompting, by the electronic device, third information after the itinerary status of the first itinerary is updated to a second state, where the second state is used for indicating that the e-ticket has been checked in at the station, and the third information includes carriage information and seat number information.

In another possible design of the second aspect, the third information further includes platform information. The platform information is used for indicating a boarding platform of the first itinerary.

In another possible design of the second aspect, after the electronic device prompts the first information, the method further includes: displaying, by the electronic device, fifth information through a floating window when the electronic device enters the carriage corresponding to the first itinerary, where the fifth information includes the carriage information and the seat number information.

In another possible design of the second aspect, after the electronic device prompts the fifth information, the method further includes: displaying, by the electronic device, the e-ticket in response to a third operation performed by the user on the fifth information, where the e-ticket is used for checking the ticket.

In another possible design of the second aspect, after the electronic device prompts the second information, the method further includes: prompting, by the electronic device, fourth information when the electronic device arrives at a destination station of the first itinerary, where the fourth information is used for prompting the user to access the e-ticket for check-out from the station; and displaying, by the electronic device, the e-ticket in response to a second operation performed by the user on the fourth information, where the e-ticket is used for check-out from the station.

In another possible design of the second aspect, the fourth information includes destination station information.

It is hereby noted that, for the design not described in detail with respect to the effects in the second aspect above, reference may be made to the relevant description in the first aspect and in the possible designs of the first aspect, and details are omitted here.

According to a third aspect, an embodiment of this application further provides an electronic device. A ticket booking app is installed in the electronic device. The electronic device includes a display screen, a memory, and one or more processors. The display screen, the memory, and the processors are coupled together. The memory stores computer program code. The computer program code includes a computer instruction. When executed by the processor, the computer instruction causes the electronic device to perform the following steps: prompting, by an electronic device, first information when the electronic device arrives at a departure station of a first itinerary, where the first information includes train number information of the first itinerary, departure time of the first itinerary, and/or check-in time of the first itinerary; prompting, by the electronic device, second information when itinerary status of the first itinerary is a first state, where the first state is used for indicating that a user corresponding to the first itinerary has entered the station through security check, and the second information includes check-in counter information of the first itinerary; displaying, by the electronic device, an e-ticket of the first itinerary in response to a first operation performed by the user on the second information, where the e-ticket is used for check-in at the station; prompting, by the electronic device, third information after the itinerary status of the first itinerary is updated to a second state, where the second state is used for indicating that the e-ticket has been checked in at the station, and the third information includes carriage information and seat number information; prompting, by the electronic device, fourth information when the electronic device arrives at a destination station of the first itinerary, where the fourth information is used for prompting the user to access the e-ticket for check-out from the station; and displaying, by the electronic device, the e-ticket in response to a second operation performed by the user on the fourth information, where the e-ticket is used for check-out from the station.

In a possible design of the third aspect, the third information further includes platform information. The platform information is used for indicating a boarding platform of the first itinerary.

In another possible design of the third aspect, when executed by a processor, a computer instruction causes the electronic device to further perform the following step: displaying, by the electronic device, fifth information through a floating window when the electronic device enters the carriage corresponding to the first itinerary, where the fifth information includes the carriage information and the seat number information.

In another possible design of the third aspect, when executed by a processor, a computer instruction causes the electronic device to further perform the following step: displaying, by the electronic device, the e-ticket in response to a third operation performed by the user on the fifth information, where the e-ticket is used for checking the ticket.

In another possible design of the third aspect, that the electronic device arrives at a departure station of a first itinerary includes: a current location of the electronic device is located in a location range of the departure station of the first itinerary in a first preset time period. A start time of the first preset time period is earlier than the departure time of the first itinerary.

In a possible design of the third aspect, when executed by a processor, a computer instruction causes the electronic device to further perform the following step: receiving, by the electronic device, status indication information from a server, where the status indication information is used for indicating itinerary status of the first itinerary, the first indication information is sent by the server to the electronic device after the user of the first itinerary enters the station through security check, and the second indication information is sent by the server to the electronic device after the e-ticket is checked in at the station; or obtaining, by the electronic device, the itinerary status of the first itinerary from the server periodically after the electronic device arrives at the departure station and/or after the check-in time arrives. The first state is obtained by the electronic device after the user of the first itinerary enters the station through security check, and the second state is sent by the server to the electronic device after the e-ticket is checked in at the station.

In another possible design of the third aspect, the server is a server of a 12306™ app.

In another possible design of the third aspect, the second information further includes floor information. The floor information is used for indicating a floor on which the check-in counter of the first itinerary is located.

In another possible design of the third aspect, the second information further includes a first control. The first control is used for triggering the electronic device to display the e-ticket. The first operation is a tap operation on the first control.

In another possible design of the third aspect, the electronic device includes a first sensing model. The first sensing model serves a function of recognizing a place of the electronic device based on an ambient sound, an image acquired by a camera, positioning by a Global Positioning System GPS, positioning by a base station, and/or Wi-Fi fingerprint information. When executed by a processor, a computer instruction causes the electronic device to further perform the following step: running, by the electronic device, the first sensing model by using the ambient sound, the image acquired by the camera, the positioning by the GPS, the positioning by the base station, and/or the Wi-Fi fingerprint information as an input, so as to output the place of the electronic device. The place is any one of the departure station, the carriage, or the destination station.

In another possible design of the third aspect, the fourth information includes destination station information, According to a fourth aspect, an embodiment of this application further provides an electronic device. A ticket booking app is installed in the electronic device. The electronic device includes a display screen, a memory, and one or more processors. The display screen, the memory, and the processors are coupled together. The memory stores computer program code. The computer program code includes a computer instruction. When executed by the processor, the computer instruction causes the electronic device to perform the following steps: prompting, by an electronic device, first information when the electronic device arrives at a departure station of a first itinerary, where the first information includes train number information of the first itinerary, departure time of the first itinerary, and/or check-in time of the first itinerary; prompting, by the electronic device, second information when itinerary status of the first itinerary is a first state, where the first state is used for indicating that a user corresponding to the first itinerary has entered the station through security check, and the second information includes check-in counter information of the first itinerary; and displaying, by the electronic device, an e-ticket of the first itinerary in response to a first operation performed by the user on the second information, where the e-ticket is used for check-in at the station.

In a possible design of the fourth aspect, when executed by a processor, a computer instruction causes the electronic device to further perform the following step: displaying, by the electronic device, the first information in at least one of a leftmost home screen interface, a lock screen interface, a main interface, or a floating window; and/or, sending, by the electronic device, the first information to a wearable device connected to the electronic device so that the first information is available for being displayed or played by the wearable device; displaying, by the electronic device, the second information in at least one of the leftmost home screen interface, the lock screen interface, the main interface, or the floating window; and and/or, sending, by the electronic device, the second information to the wearable device connected to the electronic device so that the second information is available for being displayed or played by the wearable device. The wearable device includes at least one of a bracelet, a smartwatch, or a headset.

In another possible design of the fourth aspect, that the electronic device arrives at a departure station of a first itinerary includes: a current location of the electronic device is located in a location range of the departure station of the first itinerary in a first preset time period. A start time of the first preset time period is earlier than the departure time of the first itinerary.

In another possible design of the fourth aspect, the second information further includes floor information. The floor information is used for indicating a floor on which the check-in counter of the first itinerary is located.

In another possible design of the fourth aspect, the second information further includes a first control. The first control is used for triggering the electronic device to display the e-ticket. The first operation is a tap operation on the first control.

In another possible design of the fourth aspect, when executed by a processor, a computer instruction causes the electronic device to further perform the following step: prompting, by the electronic device, six information when current time reaches start time of a second preset time period, where the sixth information is used for prompting the user to access the e-ticket for check-in at the station, and the start time of the second preset time period is earlier than or equal to the check-in time of the first itinerary; and displaying, by the electronic device, the e-ticket in response to a fourth operation performed by the user on the sixth information, where the e-ticket is used for check-in at the station.

In another possible design of the fourth aspect, the second information further includes carriage information and seat number information. When executed by a processor, a computer instruction causes the electronic device to further perform the following step: displaying, by the electronic device, the second information in response to a fifth operation performed by the user on the e-ticket.

In another possible design of the fourth aspect, when executed by a processor, a computer instruction causes the electronic device to further perform the following step: prompting, by the electronic device, third information after the itinerary status of the first itinerary is updated to a second state, where the second state is used for indicating that the e-ticket has been checked in at the station, and the third information includes carriage information and seat number information.

In another possible design of the fourth aspect, the third information further includes platform information. The platform information is used for indicating a boarding platform of the first itinerary.

In another possible design of the fourth aspect, when executed by a processor, a computer instruction causes the electronic device to further perform the following step: displaying, by the electronic device, fifth information through a floating window when the electronic device enters the carriage corresponding to the first itinerary, where the fifth information includes the carriage information and the seat number information.

In another possible design of the fourth aspect, when executed by a processor, a computer instruction causes the electronic device to further perform the following step: displaying, by the electronic device, the e-ticket in response to a third operation performed by the user on the fifth information, where the e-ticket is used for checking the ticket.

In another possible design of the fourth aspect, when executed by a processor, a computer instruction causes the electronic device to further perform the following step: prompting, by the electronic device, fourth information when the electronic device arrives at a destination station of the first itinerary, where the fourth information is used for prompting the user to access the e-ticket for check-out from the station; and displaying, by the electronic device, the e-ticket in response to a second operation performed by the user on the fourth information, where the e-ticket is used for check-out from the station.

In another possible design of the fourth aspect, the fourth information includes destination station information, According to a fifth aspect, an embodiment of this application provides a chip system. The chip system is applied to an electronic device including a display and a memory. The chip system includes one or more interface circuits and one or more processors. The interface circuit and the processor are interconnected by a wire. The interface circuit is configured to receive a signal from the memory of the electronic device and send the signal to the processor. The signal includes a computer instruction stored in the memory. When executed by the processor, the computer instruction causes the electronic device to perform the method according to any one of the first aspect, the second aspect, or a possible design of the first aspect or the second aspect.

According to a sixth aspect, this application provides a computer storage medium. The computer storage medium includes a computer instruction. When executed by a processor, the computer instruction causes the electronic device to perform the method according to any one of the first aspect, the second aspect, or a possible design of the first aspect or the second aspect.

According to a seventh aspect, this application provides a computer program product. When run on a computer, the computer program product causes the computer to perform the method according to any one of the first aspect, the second aspect, or a possible design of the first aspect or the second aspect.

Understandably, for beneficial effects that can be achieved by the electronic device described in the third aspect and the fourth aspect, the chip system described in the fifth aspect, the computer storage medium described in the sixth aspect, and the computer program described in the seventh aspect, reference may be made to the beneficial effects described in any one of the first aspect, the second aspect, or a possible design of the first aspect or the second aspect, and details are omitted here.

DETAILED DESCRIPTION OF EMBODIMENTS

The following terms "first" and "second" are merely used for description, and cannot be construed as indicating or implying relative importance or implicitly indicating a quantity of indicated technical features. Therefore, a feature defined with "first" or "second" may explicitly or implicitly include one or more of the features. In the description of an embodiment herein, unless otherwise specified, "a plurality of" means two or more.

Figure 1:
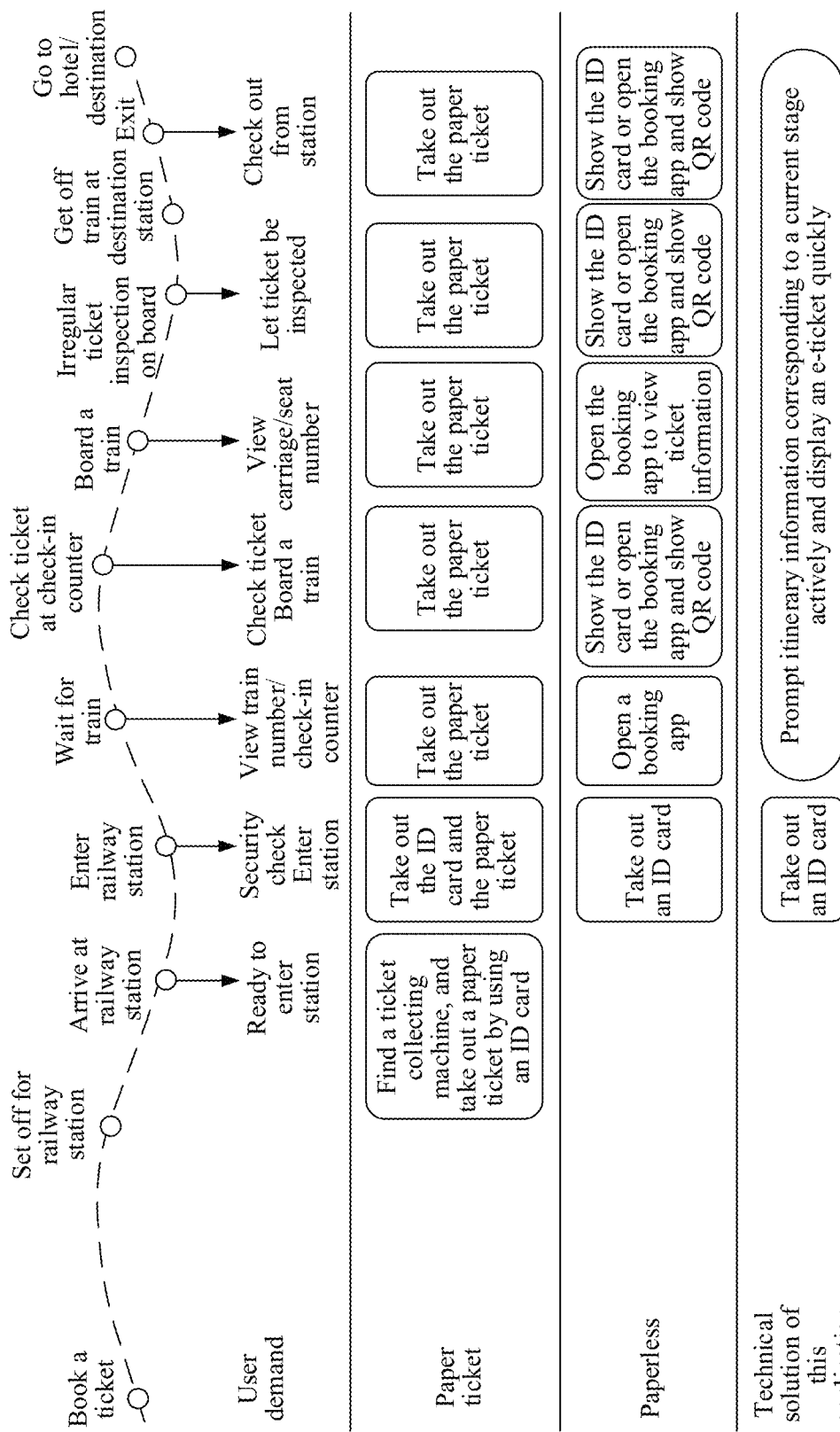
FIG. 1 is a schematic flowchart of railway travel according to an embodiment of this application.

To facilitate understanding of an embodiment of this application, the conventional technology and the technical problems existing in the conventional technology are described below first with reference to FIG. 1. As shown in FIG. 1, conventional technologies are mainly classified into paper ticket scenarios and paperless ticket scenarios.

In a paper ticket scenario, after arriving at a railway station, the user needs to be ready to enter the station. For example, the user needs to find a ticket collecting machine and take out a paper ticket from the machine by using an ID card. When entering the station through security check, the user needs to show the ID card and the paper ticket to the ticket inspector for inspection. After entering the station, the user needs to take out the paper ticket to check the train number, and find the corresponding check-in counter on a large scrollable screen in the waiting hall based on the train number. During check-in, the user needs to take out the paper ticket to check in and get on the train. After check-in, the user needs to take out the paper ticket to check the carriage number, seat number, and other information. After getting on the train, if inspected by a train attendant for the ticket irregularly, the user needs to show the paper ticket to the train attendant. After disembarking from the train at the destination station, the user needs to take out the paper ticket to check out from the station.

In the above scenario of using the paper ticket, under conventional circumstances, throughout the itinerary from arriving at the departure station to arriving at and exiting the destination station, the user needs to show his/her ID card and/or paper ticket at least 7 times. In an actual itinerary, the user puts important documents such as the ID card and/or the paper ticket in a relatively hidden and safe position to avoid loss, for example, puts the documents in a bag. Obviously, taking out the ID card and/or paper ticket several times causes inconvenience to the itinerary of the user. This defect is especially prominent when the time is tight.

To solve the above inconvenience caused by the use of the paper ticket, paperless travel has been implemented in recent years, in which the ID card and/or the e-ticket are/is used instead of the paper ticket throughout the itinerary.

In the paperless scenario, when entering the station through security check, the user needs to swipe his/her ID card through a turnstile machine to enter the station. After entry into the station, there are two cases. In a first case, the user has purchased a ticket from an official source such as a 12306™ app. In this case, the user may view the check-in counter by opening the ticket purchase app or an official account, or reading the large scrollable screen in the waiting hall, or by other means. In a second case, the user has purchased a ticket from an unofficial source. For example, if the user has purchased the ticket from the Ctrip app, the user has to find the check-in counter on the large scrollable screen based on the train number. During check-in, the user needs to take out the ID card and swipe the ID card to inspect the ticket, or the user needs to open the ticket booking app and show the e-ticket on an electronic QR code (that is, e-ticket) page, and then let the ticket be inspected by scanning the e-ticket. Before getting on the train after check-in, the user needs to open the ticket booking app and check the ticket information, and confirm the information such as carriage number and seat number. When encountering irregular ticket inspection after getting on the train, the user needs to show the ID card to the train attendant for inspection, or open the ticket booking app and show the e-ticket on the e-ticket page to the train attendant so that the train attendant scans the QR code to inspect the ticket. After disembarking from the train at the destination station, the user needs to take out the ID card and swipe the ID card through the turnstile machine to exit the station, or the user needs to open the ticket booking app and show the e-ticket on the e-ticket page, and then scan the e-ticket to exit the station.

In the above paperless scenario, the e-ticket is used in place of the paper ticket. However, under conventional circumstances, throughout the itinerary from arriving at the departure station to arriving at and exiting the destination station, the user needs to take out his/her ID card for 1 to 4 times and/or query the ticket booking app for 2 to 5 times to access the e-ticket. Each time the user attempts to access the e-ticket, the user needs to tap and select the relevant items in the ticket booking app for 5 to 11 times. Therefore, the user needs to perform 10 to 55 steps of tapping and selecting the desired items in the 2 to 5 attempts of accessing the e-ticket. Obviously, the user has to perform many tedious operations to access the e-ticket throughout the itinerary. This also brings inconvenience to the itinerary, and contradicts the time-critical itinerary rhythm.

Based on the above problems existing in the conventional technologies, an embodiment of this application provides an itinerary information prompting method applicable to electronic devices such as a mobile phone. Specifically, as shown in FIG. 1, in the technical solution of this application, during the entire itinerary from arriving at the railway station to arriving at and exiting the destination station, the user needs to take out and scan his/her ID card on just one occasion of entering the railway station. In the remaining process of the itinerary, the electronic device may detect a current stage of the itinerary. Subsequently, the electronic device may prompt the user with itinerary information that matches the stage of the itinerary. The information that matches the stage of the itinerary is the information to be urgently needed by the user at this stage of the itinerary. For example, in a waiting stage after the user enters the station through the security check, the information desired by the user is the check-in counter information. The electronic device prompts the user with the check-in counter information when detecting that the current stage is a waiting stage. Moreover, a mobile phone can quickly display the e-ticket in response to an operation performed by the user on the prompted itinerary information. In this way, it is convenient for the user to obtain the itinerary information (including the e-ticket) most desired at each stage of the itinerary, thereby reducing the difficulty for the user to obtain the itinerary information, and providing travel convenience.

As an example, the electronic device in this embodiment of this application may be a mobile phone, a tablet computer, a desktop, a laptop, a handheld computer, a notebook computer, an ultra-mobile personal computer (ultra-mobile personal computer, UMPC), a netbook, or a device that enables viewing and usage of media files such as pictures, audio, video, and/or documents. Examples of the device that enables viewing and usage of media files include a cellular phone, a personal digital assistant (personal digital assistant, PDA), and an augmented reality (augmented reality, AR)/virtual reality (virtual reality, VR) device. A specific form of the electronic device is not particularly limited herein.

The following describes some embodiments of this application in detail with reference to drawings.

Figure 2:
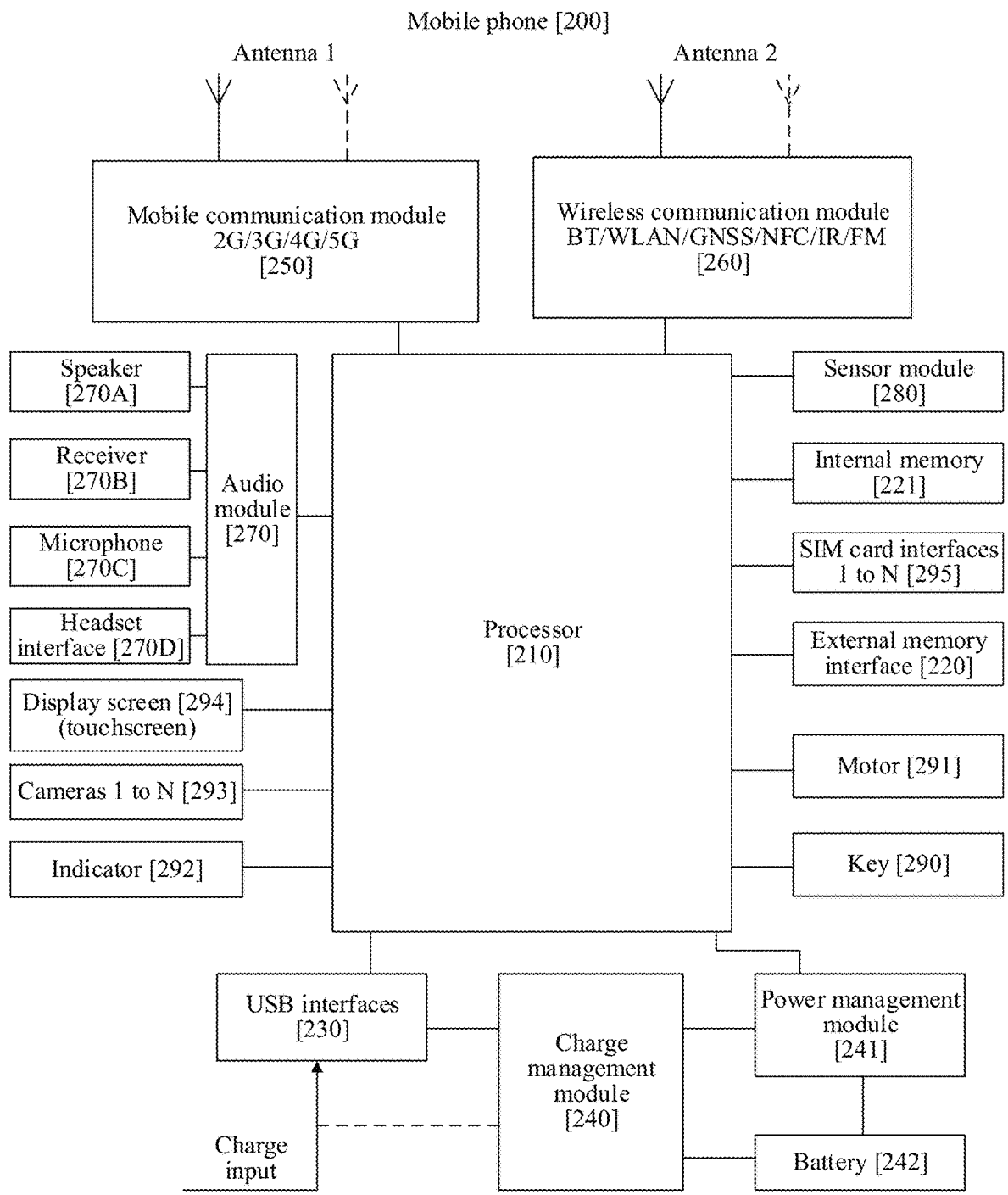
FIG. 2 is a schematic structural diagram of an electronic device according to an embodiment of this application.

FIG. 2 is a schematic structural diagram of an electronic device according to an embodiment of this application. As shown in FIG. 2, using an example in which the electronic device is a mobile phone 200, the mobile phone 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a phone receiver 270B, a microphone 270C, a headset jack 270D, a sensor module 280, a key 290, a motor 291, an indicator 292, a camera 293, a display screen 294, a subscriber identity module (subscriber identity module, SIM) card interface 295, and the like.

Understandably, the structure illustrated in this embodiment does not constitute a specific limitation on the mobile phone 200. In some other embodiments, the mobile phone 200 may include more or fewer components than those shown in the figure, or some components may be combined, or some components may be split, or components are arranged in different manners. The components in the figure may be implemented by hardware, software or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices or integrated into one or more processors.

The controller may be a neural center and command center of the mobile phone 200. The controller may generate an operation control signal according to an instruction operation code and a timing signal, to control instruction fetch and instruction execution.

A memory may be further disposed in the processor 210 to store an instruction and data. In some embodiments, the memory of the processor 210 is a cache memory. The memory may store instructions or data that the processor 210 has just used or used cyclically. If the processor 210 needs to use the instructions or data again, the instructions or the data can be directly invoked from the memory, thereby avoiding repeated access, reducing waiting time of the processor 210, and improving system efficiency.

The charging management module 240 is configured to receive a charging input from a charger. The charger may be a wireless charger or may be a wired charger. In some embodiments of wired charging, the charging management module 240 may receive charging input of a wired charger through the USB interface 230. In some embodiments of wireless charging, the charging management module 240 may receive a wireless charging input through a wireless charging coil of the mobile phone 200. The charging management module 240 may supply power to the mobile phone through the power management module 241 while charging the battery 242.

The power management module 241 is configured to connect to the battery 242, the charge management module 240, and the processor 210. The power management module 241 receives input from the battery 242 and/or the charge management module 240, to supply power to the processor 210, the internal memory 221, an external memory, the display 294, the camera 293, the wireless communication module 260, and the like. The power management module 241 may be further configured to monitor parameters such as a battery capacity, a cycle count of a battery, and a battery health state (leakage and impedance). In some other embodiments, the power supply management module 241 may alternatively be disposed in the processor 210. In some other embodiments, the power management unit 241 and the charging management module 240 may further be configured in a same device.

A wireless communication function of the mobile phone 200 may be implemented by using the antenna 1, the antenna 2, the mobile communication module 250, the wireless communication module 260, the modem processor, the baseband processor, and the like.

The mobile phone 200 implements a display function by using the GPU, the display 294, the AP, and the like. The GPU is a microprocessor for image processing, and connects the display 294 and the application processor. The GPU is configured to perform mathematical and geometric calculation for graphic rendering. The processor 210 may include one or more GPUs that execute program instructions to generate or change displayed information.

The display screen 294 is configured to display an image and a video. The display screen 294 is a foldable screen (such as a flexible foldable screen or a multi-screen foldable screen). The display screen 294 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a MiniLed, a MicroLed, a Micro-oLed, and quantum dot light emitting diodes (quantum dot light emitting diodes, QLED).

The mobile phone 200 may implement a photographing function by using an ISP, camera 293, video codec, GPU, display screen 294, app processor, or the like.

The external memory interface 220 may be configured to connect to an external storage card, for example, a micro SD card, to expand a storage capability of the mobile phone 200. The external memory card communicates with the processor 210 through an external memory interface 220 to implement a data storage function. For example, the external storage card stores music, videos, and other media files.

The internal memory 221 may be configured to store computer executable program code. The executable program code includes instructions. The processor 210 runs the instructions stored in the internal memory 221, to perform various functional apps and data processing of the mobile phone 200. The inner memory 221 may include a program storage area and a data storage area. The storage program area may store an operating system, an application program required by at least one function (for example, a sound-play function and an image play function), and the like. The data storage area may store data (for example, audio data and a phone book) and the like created in a process of using the mobile phone 200. In addition, the internal memory 221 may include a high-speed random-access memory, or may include a non-volatile memory such as at least one magnetic disk storage device, a flash memory device, and a universal flash storage (universal flash storage, UFS).

The mobile phone 200 may implement an audio function by using the audio module 270, the speaker 270A, the phone receiver 270B, the microphone 270C, the headset jack 270D, the application processor, and the like. For example, the audio functions include music playback and sound recording.

The button 290 includes a power-on button, a volume button, or the like. The key 290 may be a mechanical key, or may be a touch button. The mobile phone 200 may receive a key input, and generate a key signal input related to user setting and function control of the mobile phone 200.

The engine 291 may generate a vibration prompt. The engine 291 may be used for vibration prompt for an incoming call, and may also be used for vibration feedback for a touch. For example, touch operations acting on different applications (for example, photographing, audio playback, or the like) may correspond to different vibration feedback effects. In response to touch operations that act on different areas of the display screen 294, the motor 291 may also be corresponding to different vibration feedback effects. Different application scenarios (for example, a time reminder, information receiving, an alarm clock, and a game) may also correspond to different vibration feedback effects. The touch vibration feedback effect may also be customized.

The indicator 292 may be an indication lamp and may be configured to indicate a charging status, a power change, a message, a missed call, a notification, and the like.

The SIM card port 295 is configured to connect to a SIM card. The SIM card may be inserted into the SIM card interface 295 or plugged from the SIM card interface 295, to come into contact with or be separated from the mobile phone 200. The mobile phone 200 may support 1 or N SIM card interfaces, wherein N is a positive integer greater than 1. The SIM card port 295 may support a nano-SIM card, a micro-SIM card, an SIM card, and the like. A plurality of cards can be inserted into the same SIM card interface 295 together. The plurality of cards may be the same as or different from each other. The SIM card interface 295 is compatible with different types of SIM cards. The SIM card interface 295 is also compatible with an external storage card. The mobile phone 200 interacts with a network through the SIM card, to implement functions such as a call and data communication. In some embodiments, the mobile phone 200 employs an embedded SIM (eSIM) card. The eSIM card may be embedded in the mobile phone 200 and cannot be separated from the mobile phone 200.

All the methods described in the following embodiments are applicable to a mobile phone 200 that assumes the above hardware structure. In this embodiment of this application, after detecting a current stage of an itinerary of the user, the mobile phone may actively prompt the user with itinerary information that matches the stage of the itinerary. The prompting manners come in two main types. A first type is to prompt the itinerary information on the mobile phone directly. A second type is to prompt the itinerary information through another electronic device connected to the mobile phone, such as a watch, a bracelet, or a headset.

The first type of prompting manners is to prompt the itinerary information on the mobile phone directly.

In this embodiment of the application, a prompt on the mobile phone mainly refers to a prompt of a quick access on the mobile phone to enable the user to access information conveniently. The quick access on the mobile phone includes but is not limited to a lock screen interface, a main interface, a floating window, and/or a leftmost home screen interface. The following describes how to prompt the itinerary information on the mobile phone directly, using the four types of quick access as examples.

Figure 3A:
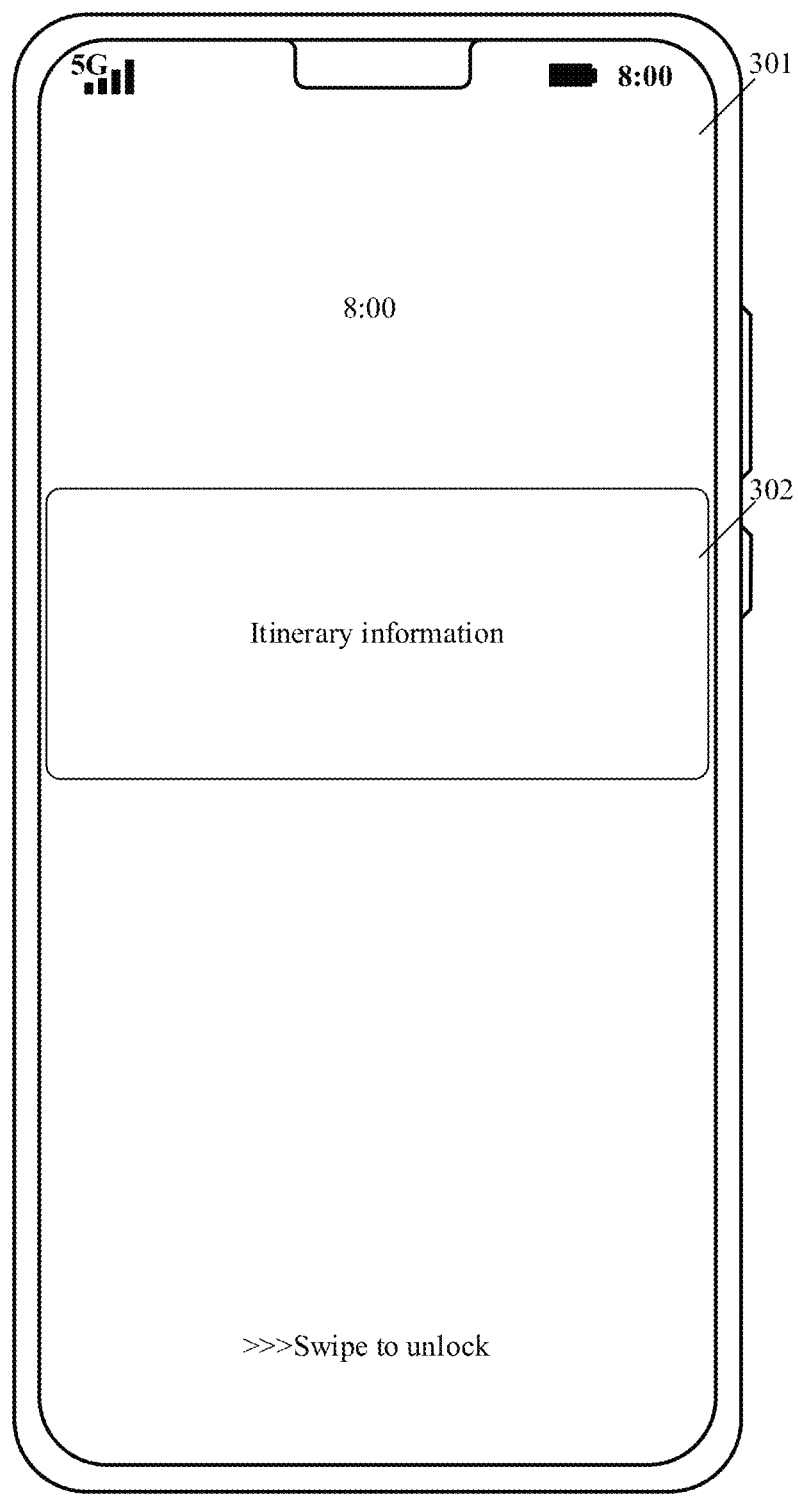
FIG. 3A, FIG. 3B, FIG. 3C, and FIG. 3D are a schematic diagram of an itinerary information prompting method according to an embodiment of this application.

Example I: Prompting the itinerary information in the lock screen interface. The mobile phone may display the itinerary information through a lock screen notification 302 in a lock screen interface 301 shown in FIG. 3A. In this way, the mobile phone can prompt the itinerary information upon lighting up the screen of the mobile phone by tapping. Therefore, the mobile phone can prompt the itinerary information to the user without being unlocked.

Figure 3B:
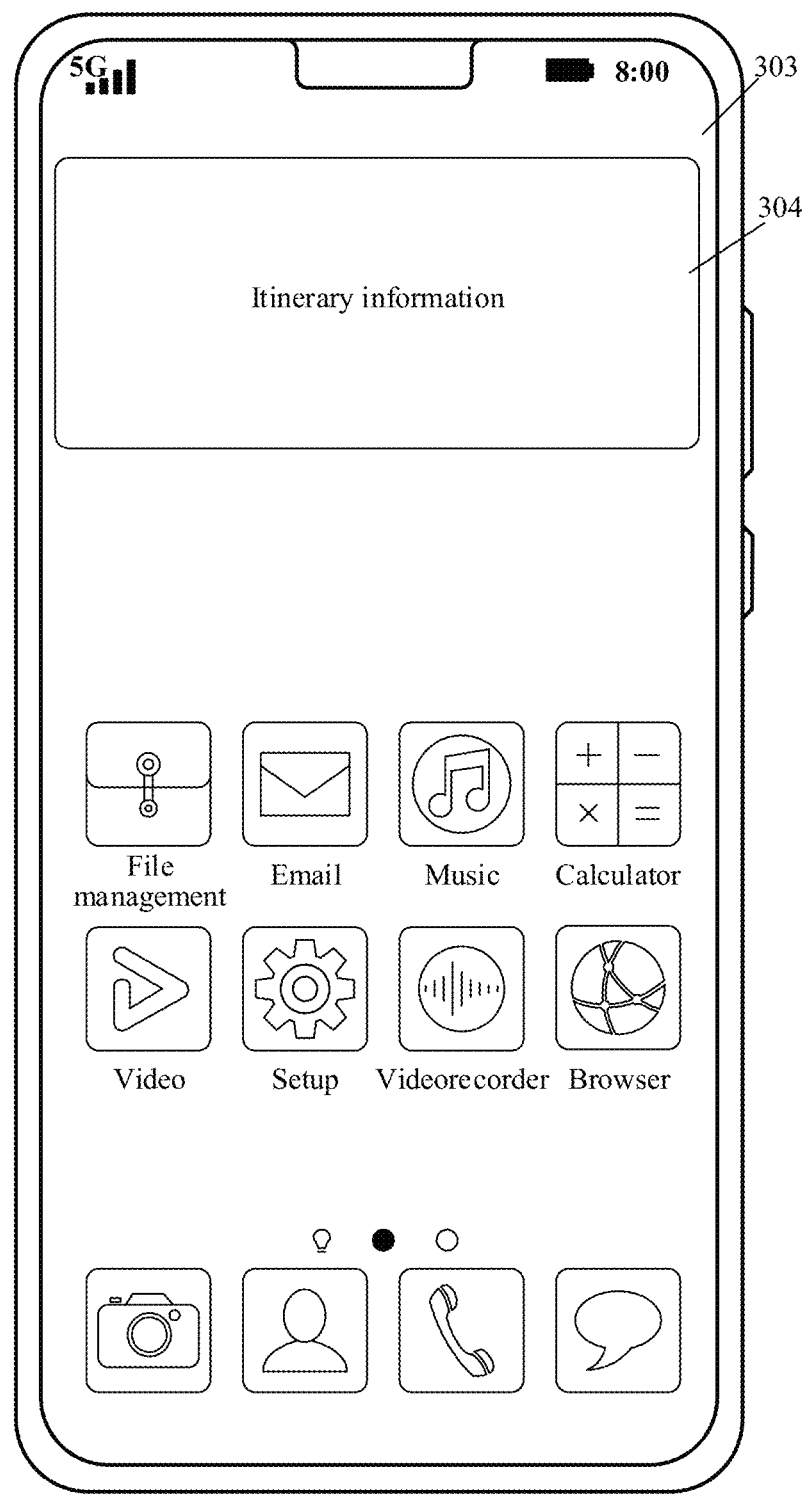

Example II: Prompting the itinerary information in the main interface. The mobile phone may display the itinerary information through a home screen card 304 in a main interface 303 shown in FIG. 3B. In this way, the mobile phone can prompt the itinerary information upon opening the main interface. Therefore, the mobile phone can prompt the itinerary information to the user without being tapped by the user for many times to make selections.

Figure 3C:
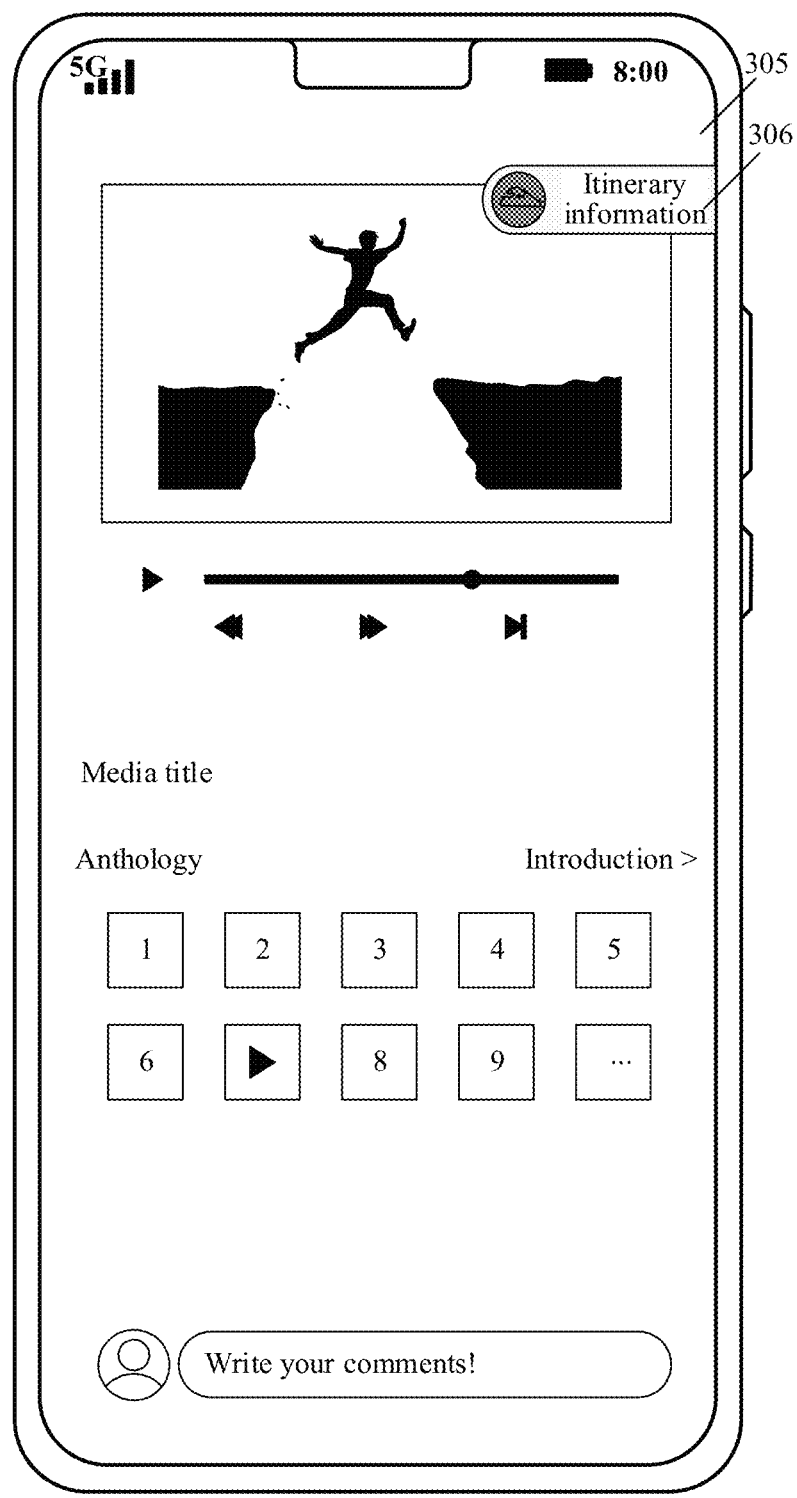

Example III: Prompting the itinerary information in the floating window. The mobile phone may display the itinerary information through a floating window 306 in an app interface 305 shown in FIG. 3C. In this way, when an app on the mobile phone is in use, the mobile phone may prompt the itinerary information in the floating window. Therefore, the mobile phone can prompt the itinerary information to the user without exiting the app currently in use. It is hereby noted that the floating window may be displayed in any current interface rather than displayed in only the app interface. For example, if the main interface is currently being displayed, the floating window may be displayed in the main interface. If the leftmost home screen interface is currently being displayed, the floating window may be displayed in the leftmost home screen interface.

Figure 3D:
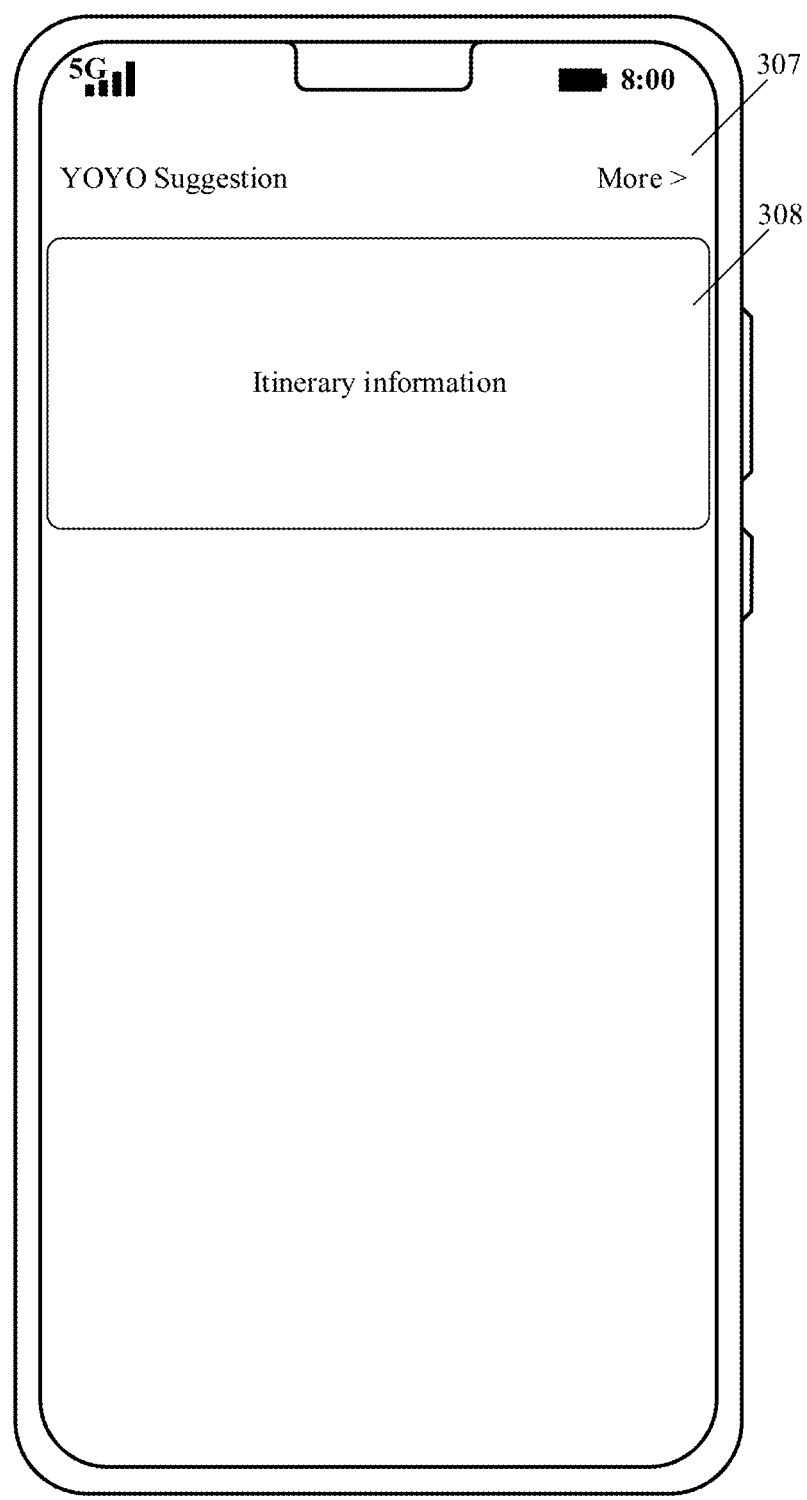

Example IV: Prompting the itinerary information in the leftmost home screen interface. The mobile phone may display itinerary information through a leftmost home screen notification 308 in a leftmost home screen interface 307 shown in FIG. 3D. In this way, the itinerary information can be directly prompted in the leftmost home screen of the mobile phone, without requiring the user to open the ticket booking app to view the information.

In an actual travel process, the user usually carries various items such as a suitcase and a backpack, make it usually impracticable to hold the mobile phone in hand. Correspondingly, the user is unable to obtain in time the itinerary information prompted on the mobile phone. In view of this, in this embodiment of this application, the following second prompting manner is further provided.

The second type of prompting manner is to prompt the itinerary information through another electronic device connected to the mobile phone.

The other electronic device is usually a wearable electronic device such as a smartwatch, a bracelet and/or a headset. In this way, the user can obtain relevant itinerary information without taking out the mobile phone, thereby being facilitated to view the information. Specifically, the mobile phone may detect whether the wearable device connected to the mobile phone is worn by the user, and detect whether the mobile phone is in the user's hand. If it is detected that the wearable device connected to the mobile phone is worn by the user and the mobile phone is not in the user's hand, the itinerary information may be prompted by the wearable device. The following describes the manners of prompting the itinerary information in other electronic devices, using an example in which the itinerary information is prompted in a watch and a headset separately.

Figure 4:
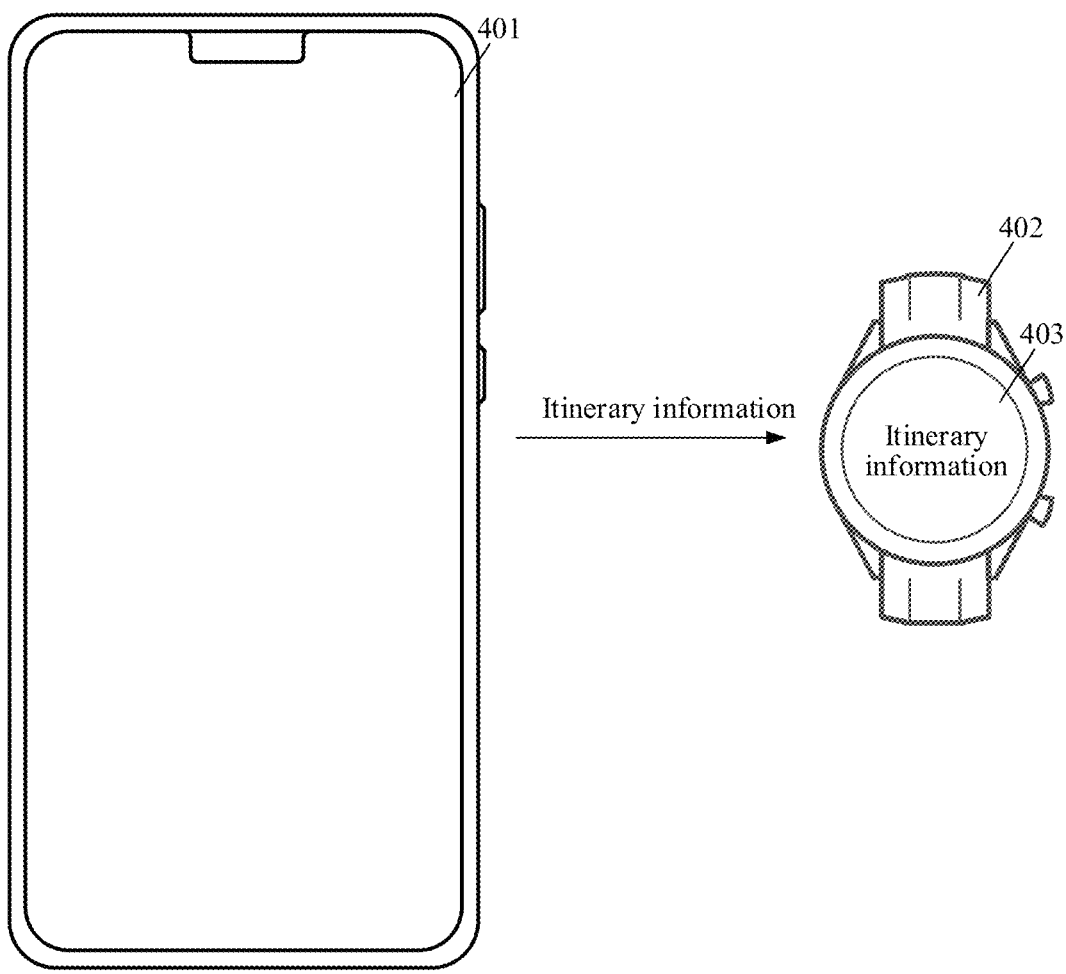
FIG. 4 is a schematic diagram of another itinerary information prompting method according to an embodiment of this application.

Example I: Prompting the itinerary information in a watch. When the user is wearing a smartwatch and the mobile phone is not in the user's hand, the itinerary information may be prompted by the watch. The mobile phone 401 shown in FIG. 4 may send the itinerary information to the smartwatch 402, and then the smartwatch 402 displays the itinerary information on a dial 403. The watch may prompt the itinerary information in the form of vibration, text and/or a user experience (User Experience, UX) effect, and the like. In this way, the itinerary information can be prompted by the watch worn by the user, without requiring the user to take out the mobile phone.

Figure 5:
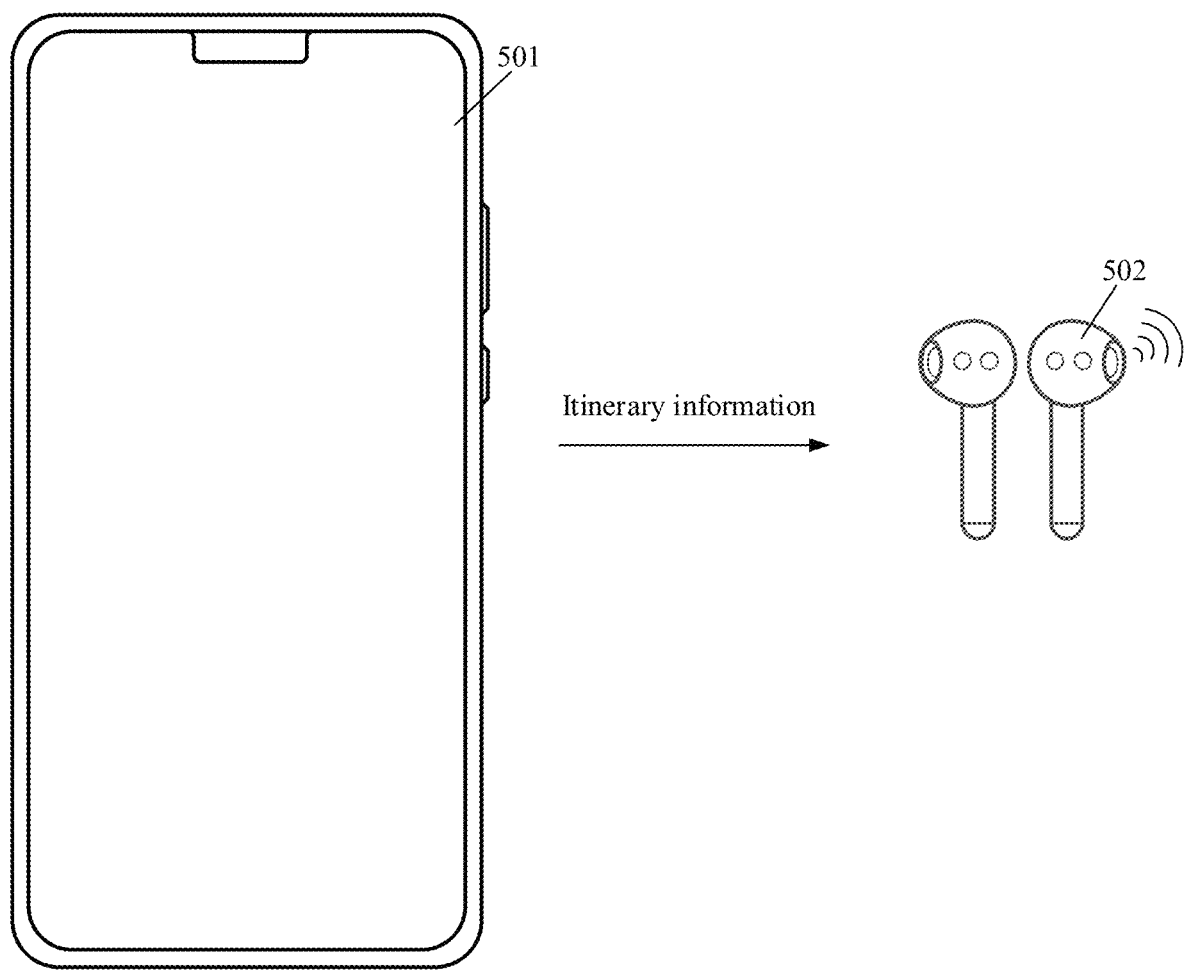
FIG. 5 is a schematic diagram of another itinerary information prompting method according to an embodiment of this application.

Example II: Prompting the itinerary information in a headset. When the user wears the headset to listen to music, listen to a book, or talk, it is considered that the headset is worn on the user's body. If the mobile phone is not in the user's hand at this time, a prompt may be played by the headset. As an example, the mobile phone 501 shown in FIG. 5 may send the itinerary information to the headset 502, and then the headset 502 may play the itinerary information to prompt the itinerary information. The prompt is played in the headset usually when a critical state of the itinerary changes. As an example, a reminder is played at times such as "check-in starts", "train number is about to be late" or "the train is about to arrive at the destination station and passengers are ready to disembark", thereby preventing the user from missing such critical moments. For example, when the check-in time starts, a prompt says "the train number G72 you are taking from Shenzhen North to Beijing has started check-in, and the check-in counter is 80A". In this way, the hands and eyes can be freed, and the itinerary information can be prompted by voice.

It is hereby noted that a watch usually can display a QR code but a headset usually cannot display a QR code. Therefore, in a stage in which the e-ticket (usually in the form of a QR code) needs to be used (for example, in the check-in stage), the itinerary information may be prompted on the watch, but the itinerary information is usually unable to be prompted on the headset alone.

In addition, the first prompting manner and the second prompting manner may be used alone or in combination. For example, the itinerary information is prompted on both the smartwatch and the mobile phone.

Finally, it is hereby noted that in practical implementation, the itinerary information of each stage may be prompted regularly in one or more of the above manners. For example, the electronic device always prompts the itinerary information as a leftmost home screen notification in the leftmost home screen interface. In this way, the calculation is simplified, and the user is conveniently accustomed to the regular prompt manner. Alternatively, the itinerary information at different stages may be prompted in different ways so that the prompting manner is adapted to each stage. Alternatively, the itinerary information may be prompted in a corresponding manner depending on the status of the mobile phone. For example, when the screen is off, the itinerary information is prompted in the lock screen interface after the screen lights up. When a headset is connected, the itinerary information is played by the headset. When the app is in use, the itinerary information is prompted in the floating window. This is not particularly limited in this embodiment of this application. The technical solution of this application is described below, using an example in which the itinerary information is prompted in a lock screen interface or a floating window.

Figure 6:
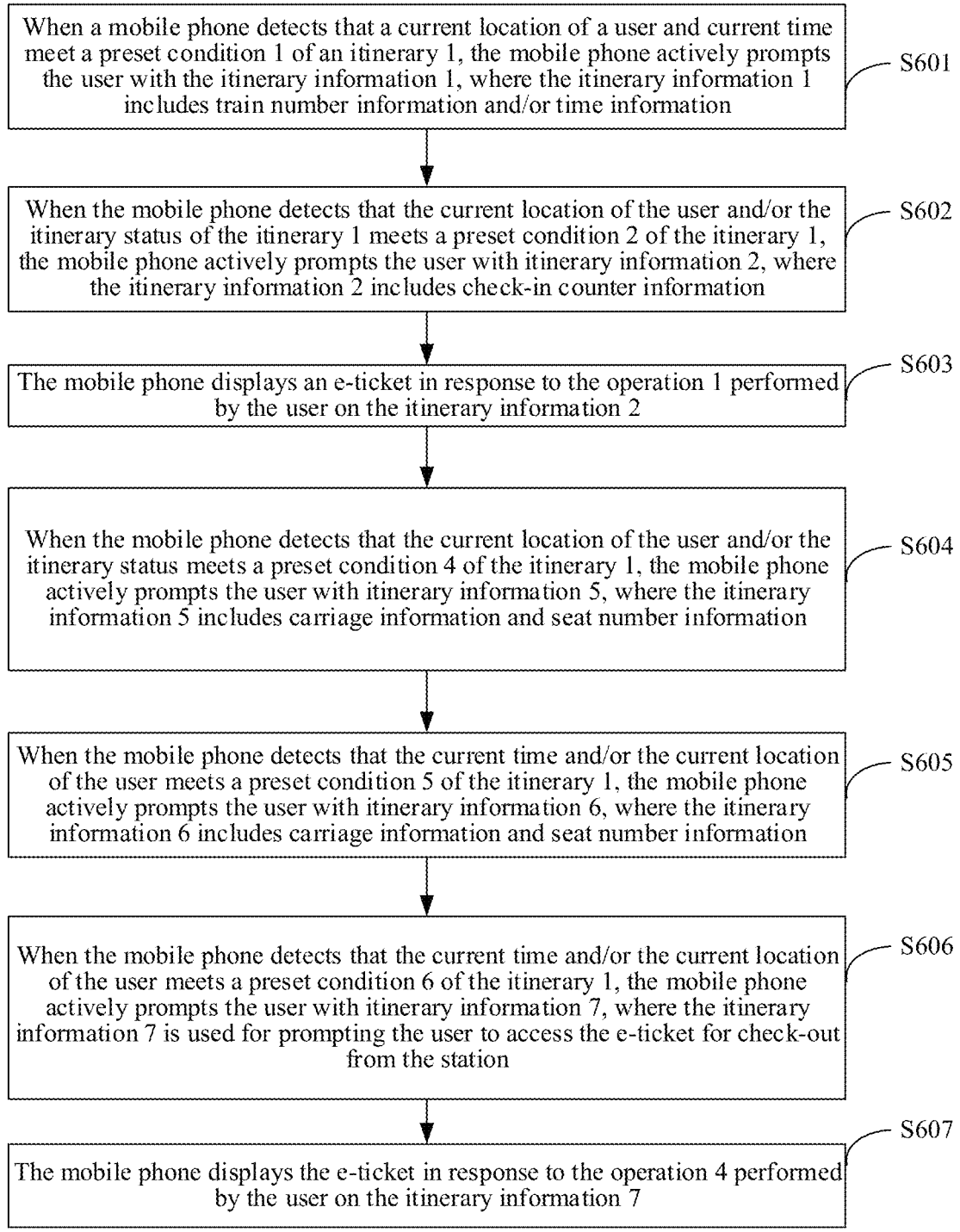
FIG. 6 is a flowchart of an itinerary information prompting method according to an embodiment of this application.

An itinerary information prompting method according to an embodiment of this application is described below in a time sequence from arriving at a departure station to arriving at and exiting a destination station. The itinerary information prompting method according to this embodiment of this application is applied to a mobile phone. A ticket booking app is installed in the mobile phone. The ticket booking app can provide railway ticket purchase services. Specifically, as shown in FIG. 6, the method includes steps S601 to S607.

Stage 1 is a stage of arriving at a departure station. After the user completes the ticket purchase, the user will set off for the departure station on the day of the itinerary. The stage of arriving at the departure station means a stage in which the user has arrived at the departure station before entering a waiting hall. At the stage of arriving at the departure station, the information such as a train number and time (such as departure time) needs to be prompted to the user so that the user can control the time of entering the station.

S601. When the mobile phone detects that a current location of the user and current time meet a preset condition 1 of an itinerary 1, the mobile phone actively prompts the user with the itinerary information 1. The itinerary information 1 includes train number information and/or time information.

The itinerary 1 is an itinerary in which the user has purchased a ticket for a travel before completing the travel. Completing the travel means having exited a destination station of the itinerary. Moreover, the itinerary 1 is also referred to as a first itinerary, and the itinerary information 1 is also referred to as first information.

On the one hand, before step S601, the mobile phone may acquire the departure station of the itinerary 1, and detect whether the current location falls within a location range 1 of the departure station. The location range 1 of the departure station is also referred to as a location range of the departure station.

Figure 7:
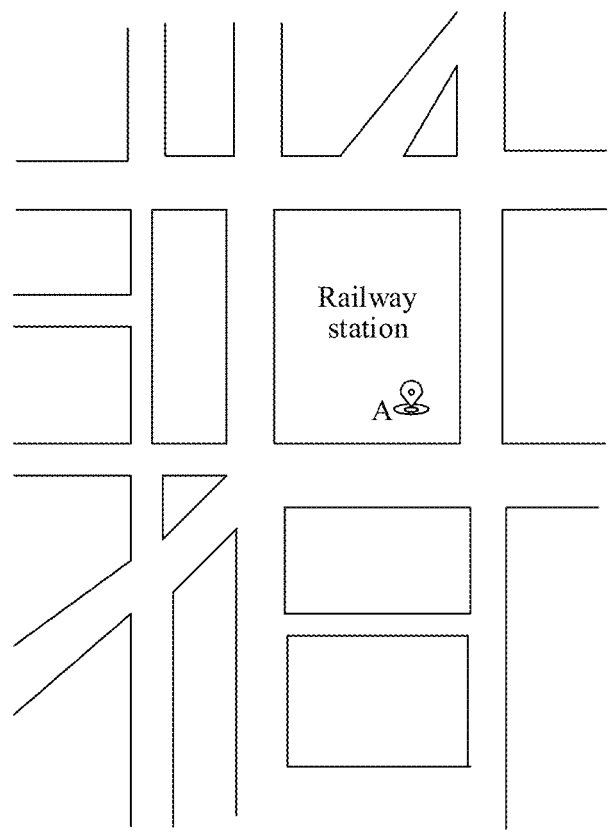
FIG. 7 is a schematic diagram of a user location according to an embodiment of this application.

Location-related detection is performed. During the detection, the mobile phone may detect, through geo-fencing, whether the current location falls within the location range 1 of the departure station. Geo-fencing is a technology of delineating a virtual geographic boundary with a virtual fence. The geo-fencing technology determines a location based on a combination of Global Positioning System (Global Positioning System, GPS), Wi-Fi positioning, base station information (cell id), and the like. Once the user enters the location range of the departure station, it can be detected that the mobile phone has entered the departure station. For example, the location A of the user in FIG. 7 is located by geo-fencing, and the location A is matched against the location range 1 of the departure station to detect whether the location A falls within the location range 1.

On the one hand, the mobile phone may acquire the departure time of the itinerary 1, and detect whether the current time has reached a preset time period 1. The departure time of the preset time period 1 is usually earlier than the departure time. For example, the preset time period 1 is a time period prior to the departure time in the day of the departure time, or is 6 hours prior to the departure time. The preset time period 1 is also referred to as a first preset time period.

As an example, the preset time period 1 is 6 hours prior to the departure time. It is assumed that the departure time of the itinerary 1 is 16:00 July 12. If the current time has reached 10:00 July 12 (that is, a time point that is 6 hours prior to departure), it is detected that the current time has reached the preset time period 1.

If the current location falls within the location range 1 of the departure station, and the current time has reached the preset time period 1, then the current location and the current time meet the preset condition 1.

Based on the above two factors detected, the mobile phone can detect satisfaction of the preset condition 1 just immediately before the departure time of the itinerary 1 after the user arrives at the departure station. In this way, the rationality of the detection result is improved, and it can be accurately determined that the user has arrived at the departure station and is about to start the itinerary 1. For example, the departure time is 14:00 July 12, and the first preset time period 1 is a time period prior to the departure time in the day of the departure time, then the user travelling to the departure station to send off a relative or friend on July 11 does not intend to start the itinerary 1. Because the current time has not reached the preset time period 1, this occasion will not be detected as meeting the preset condition 1.

If it is detected that the current location and the current time meet the preset condition 1 (that is, the condition in step S601), it indicates that the user is in the stage of arriving at the departure station. In this case, the mobile phone actively prompts the user with itinerary information 1.

Figure 8:
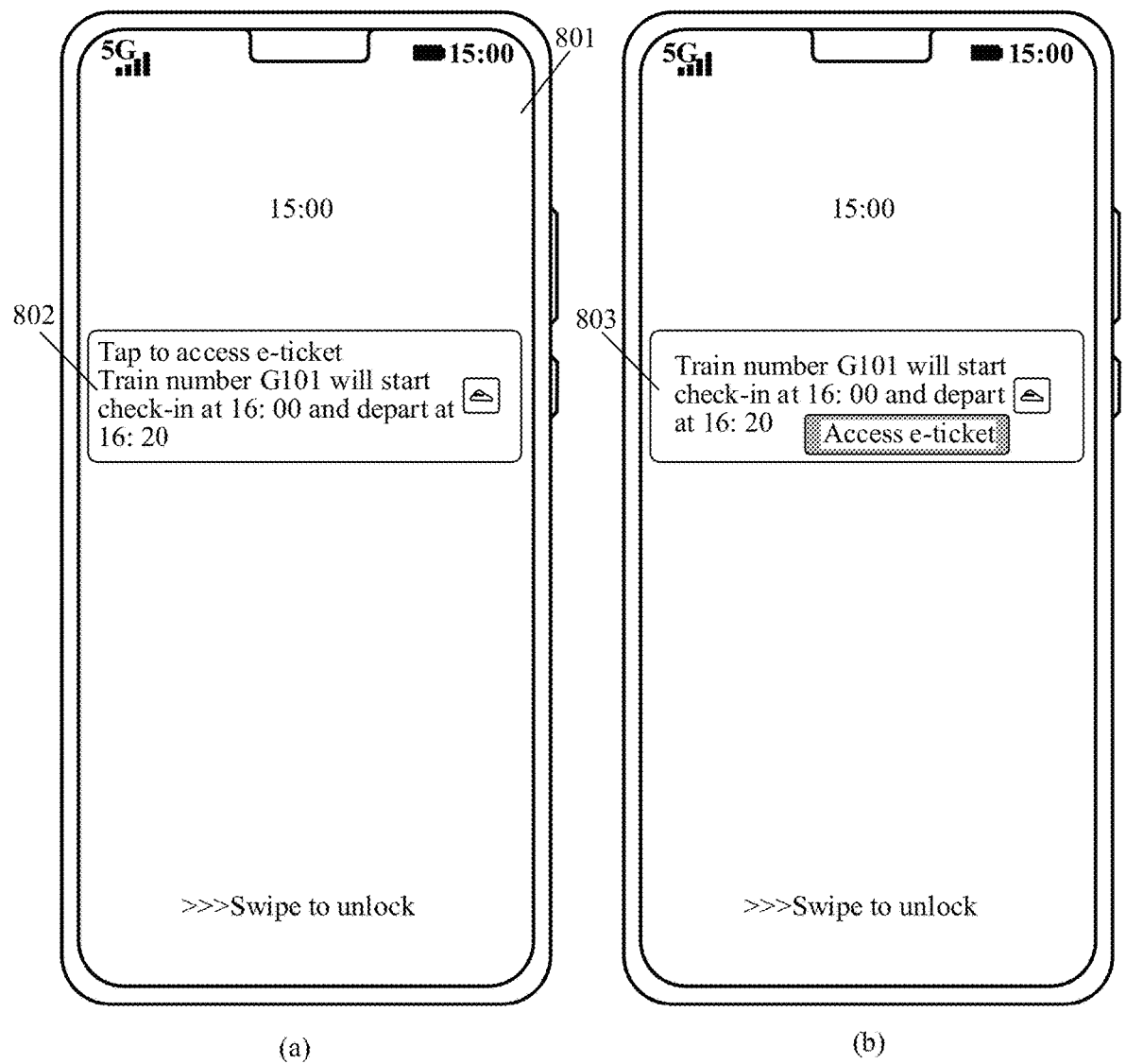
FIG. 8 is a schematic diagram of a lock screen interface according to an embodiment of this application.

Using an example in which the itinerary information is prompted through a lock screen interface, after detecting that the current location meets the preset condition 1, the mobile phone may display a lock screen interface 801 shown in part (a) of FIG. 8. The lock screen interface 801 includes a lock screen notification 802. The lock screen notification 802 displays the itinerary information 1.

In some embodiments, the itinerary information 1 includes train number information and/or time information. The time information may be departure time and/or check-in time. Alternatively, the time information may be a time length prior to the departure time and/or check-in time. In this way, useful information for controlling the time of entering the station can be prompted to the user. For example, the itinerary information 1 shown in part (a) of FIG. 8 includes the train number G101, the check-in time 16:00, and the departure time 16:20.

It is hereby noted that in this embodiment of this application, the departure time of the itinerary 1 may be a scheduled departure time. The scheduled departure time is a departure time scheduled in advance by the railway authority to be implemented if no exceptions (such as extreme weather) occur. Alternatively, the departure time may be an adjusted departure time. The adjusted departure time is a departure time adjusted by the railway authority in view of exceptions. Similarly, the check-in time of the itinerary 1 may be a scheduled check-in time. The scheduled check-in time is a check-in time scheduled in advance by the railway authority to be implemented if no exceptions (such as extreme weather) occur. Alternatively, the check-in time may be an adjusted check-in time. The adjusted check-in time is a check-in time adjusted by the railway authority in view of exceptions. Understandably, the adjusted departure time and/or the adjusted check-in time is more in line with the real-time itinerary progress and conducive to obtaining an accurate detection result.

In some other embodiments, the itinerary information 1 further includes prompt information 1. The prompt information 1 is used for prompting to obtain an e-ticket, and can facilitate the user to quickly access the e-ticket. The prompt information 1 may be a prompt text. For example, the itinerary information 1 shown in part (a) of FIG. 8 further includes a prompt text "Tap to access e-ticket". Alternatively, the prompt information 1 may be a control that serves a prompting function. For example, the functional control is an "Access e-ticket" button shown in part (b) of FIG. 8. The button is used for triggering the mobile phone to display the e-ticket, and also serves a prompting function.

Conversely, if it is detected that the current location or the current time does not meet the preset condition 1, it indicates that the user is not in the stage of arriving at the departure station. In this case, the mobile phone does not actively prompt the user with the itinerary information 1. Instead, the mobile phone continues to detect whether the current location of the user and current time meet the preset condition 1.

Stage 2 is a waiting stage. After arriving at the departure station, the user enters the waiting hall inside the station to wait for the train after passing the security check. The waiting stage means a stage from entering the waiting hall to wait for the train to check-in. In the waiting stage, the check-in counter information needs to be prompted to the user so that the user can find the corresponding check-in counter and wait for ticket inspection.

S602. When the mobile phone detects that the current location of the user and/or the itinerary status of the itinerary 1 meets a preset condition 2 of the itinerary 1, the mobile phone actively prompts the user with itinerary information 2. The itinerary information 2 includes check-in counter information.

The itinerary information 2 is also referred to as second information.

If the current location and/or itinerary status meets the preset condition 2, it indicates that the user has entered the waiting hall and is in the waiting stage. For example, if the itinerary status is a security-checked state, the preset condition 2 is met.

In some embodiments, before step S602, the mobile phone may detect whether the current location of the user meets the preset condition 2.

During the detection, after detecting that the user has arrived at the departure station, the mobile phone may further detect, through a geo-fence, whether the current location falls within the location range 2 of the waiting hall. If the current location falls within the location range 2 of the waiting hall, the current location of the user meets the preset condition 2.

In a specific implementation, in order to improve the accuracy of the positioning result, the current location is further determined in real time through a Wi-Fi positioning technology after it is detected that the user has arrived at the departure station. The Wi-Fi positioning technology can accurately determine the current location in the waiting hall, thereby compensating for inaccuracy of the GPS positioning in an indoor environment.

The Wi-Fi signal receivable by the mobile phone varies depending on whether the user is outside or inside the waiting hall. Each Wi-Fi access point (AP) device is located at a corresponding coordinate location. Based on the Wi-Fi signal and the coordinate location, the current location of the user can be determined.

Figure 9:
FIG. 9 is a schematic diagram of a Wi-Fi setting interface according to an embodiment of this application.

Example I: The Wi-Fi signal received by the mobile phone at 15:05 is shown in the interface 901 shown in part (a) of FIG. 9. The available wireless local area network (Wireless Local Area Network, WLAN) list in the interface 901 includes 2 Wi-Fi hotspots: "KFC (Chengdu East Railway Station)" and "Sichuan Specialties", and the signals are very weak. If the coordinate data of 2 access point (AP) devices corresponding to the 2 Wi-Fi hotspots shows that the 2 AP devices are both in the waiting hall, then it is determined based on the coordinate data and the signal strength of the Wi-Fi signal, that the current location at 15:05 is outside the waiting hall.

Example II: The Wi-Fi signal received by the mobile phone at 15:10 is shown in the interface 902 shown in part (b) of FIG. 9. The available WLAN list in the interface 902 includes 5 Wi-Fi hotspots: "KFC (Chengdu East Railway Station)", "Sichuan Specialties", "Zhangfei Beef", and so on, and the signals of the hotspots are in decline stepwise. If the coordinate data of 5 AP devices corresponding to the 5 Wi-Fi hotspots shows that the 5 AP devices are both in the waiting hall, then it is determined based on the coordinate data and the signal strength of the Wi-Fi signal, that the current location at 15:10 is inside the waiting hall.

In some other embodiments, before step S602, the mobile phone may detect whether the itinerary status of the itinerary 1 meets a preset condition 2.

After detecting that the user has arrived at the departure station, the mobile phone may monitor whether the itinerary status of the itinerary 1 is updated to a state 1. The state 1 is used for indicating that the user has completed the security check. If the itinerary status of the itinerary 1 is updated to the state 1, the itinerary status meets the preset condition 2. The state 1 is also referred to as a first state.

Specifically, after the user purchases a train ticket on a ticket booking app, the server of 12306™ (hereinafter referred to as "server") records the corresponding itinerary information. Understandably, whether the train ticket is purchased from an official source or an unofficial source (such as Ctrip app), the server records the itinerary information. After completing purchase of the ticket and arriving at the departure station, the user swipes the ID card and/or scans the human face through the turnstile machine to trigger authentication on the server. If authenticating the user successfully, the server sends an authentication success message to the turnstile machine. Upon receiving the authentication success message, the turnstile machine opens the entrance to let the user into the waiting hall to wait for the train. At this time, the server updates the itinerary status of an itinerary to the state 1, where the itinerary is associated with the successfully authenticated ID card and/or human face. The mobile phone can obtain the itinerary status of the itinerary 1 by sending a status query request of the itinerary 1 to the server. If the server has updated the itinerary status of the itinerary 1 to the state 1, it can be found that the itinerary status is the state 1. Alternatively, after the itinerary status of the itinerary 1 is updated to the state 1, the server may send the itinerary status of the itinerary 1 to the mobile phone on which the itinerary 1 is ordered. In this way, the mobile phone can detect that the itinerary status of the itinerary 1 is updated to the state 1.

Figure 10:
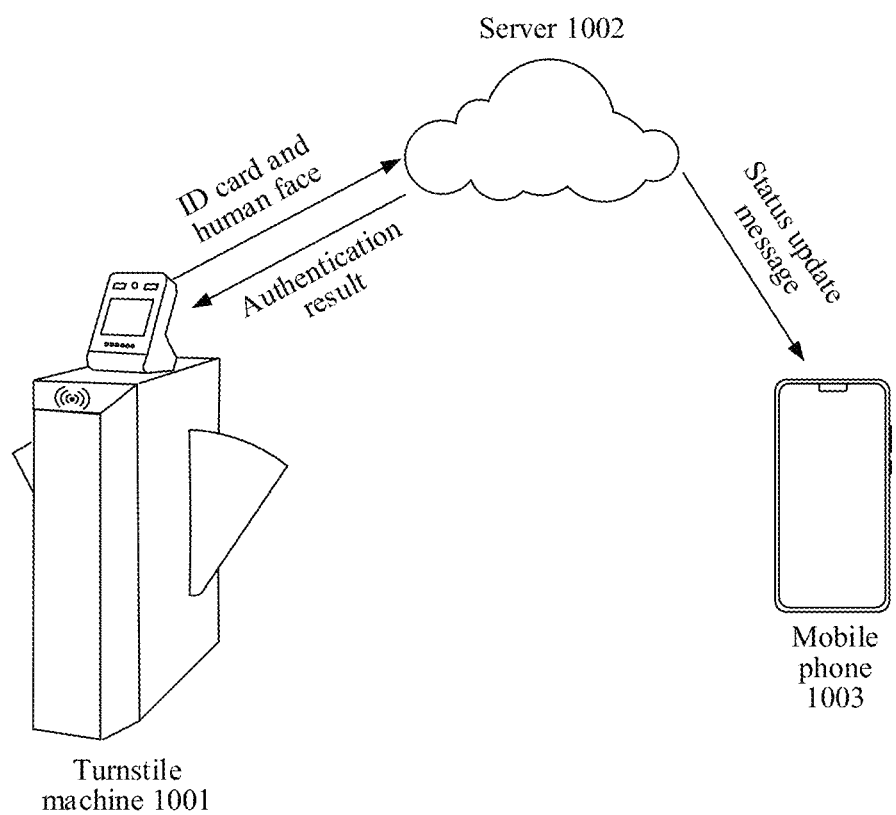
FIG. 10 is a schematic diagram of an itinerary status updating process according to an embodiment of this application.

As an example, as shown in FIG. 10, after the user swipes the ID card and scans the human face, the turnstile machine 1001 may send the ID card and human face information to the server 1002. After completing authentication, the server 1002 sends an authentication result to the turnstile machine 1001. Moreover, if the authentication result indicates successful authentication, the server 1002 may update the status of the corresponding itinerary to the state 1, and at the same time, send a status update message to the 12306™ app on the mobile phone 1003. The 12306™ app may synchronously set the itinerary status to the state 1 based on the status update message. In this way, the mobile phone 1003 can detect that the itinerary status is updated to the state 1.

In other words, the mobile phone may receive status indication information from the server. The status indication information is used for indicating itinerary status of the itinerary 1. The first indication information is sent by the server to the mobile phone after the user of the itinerary 1 enters the station through security check. Alternatively, after the mobile phone arrives at the departure station, the mobile phone may periodically obtain the itinerary status of the itinerary 1 from the server. The state 1 is obtained by the mobile phone after the user of the itinerary 1 enters the station through security check.

It is hereby noted that in an actual travel, same-station interchange may occur. That is, at the end of an itinerary 2 (the itinerary before the interchange), the user directly enters a waiting hall through an interchange passage in a destination station of the itinerary 2 without exiting the destination station, and continues to wait for a train of the itinerary 1. In this case, the mobile phone may also detect the itinerary status in a way similar to step S602 above. As an example, the mobile phone may detect whether the current location of the user and/or the itinerary status of the itinerary 2 meets a preset condition 2 of the itinerary 1. For example, if the mobile phone detects that the itinerary status of the itinerary 2 is a state of completing check-in through the interchange passage inside the destination station of the itinerary 2, then the itinerary status of the itinerary 2 meets the preset condition 2 of the itinerary 1. For another example, if the mobile phone detects that the current location of the user falls within a location range 2 of the waiting hall, the current location of the user meets the preset condition 2 of the itinerary 1.

If it is detected that the current location and/or the itinerary status meets the preset condition 2 (that is, the condition in step S602), it indicates that the user has entered the waiting hall and is in the waiting stage. In this case, the mobile phone actively prompts the user with itinerary information 2.

Figure 11:
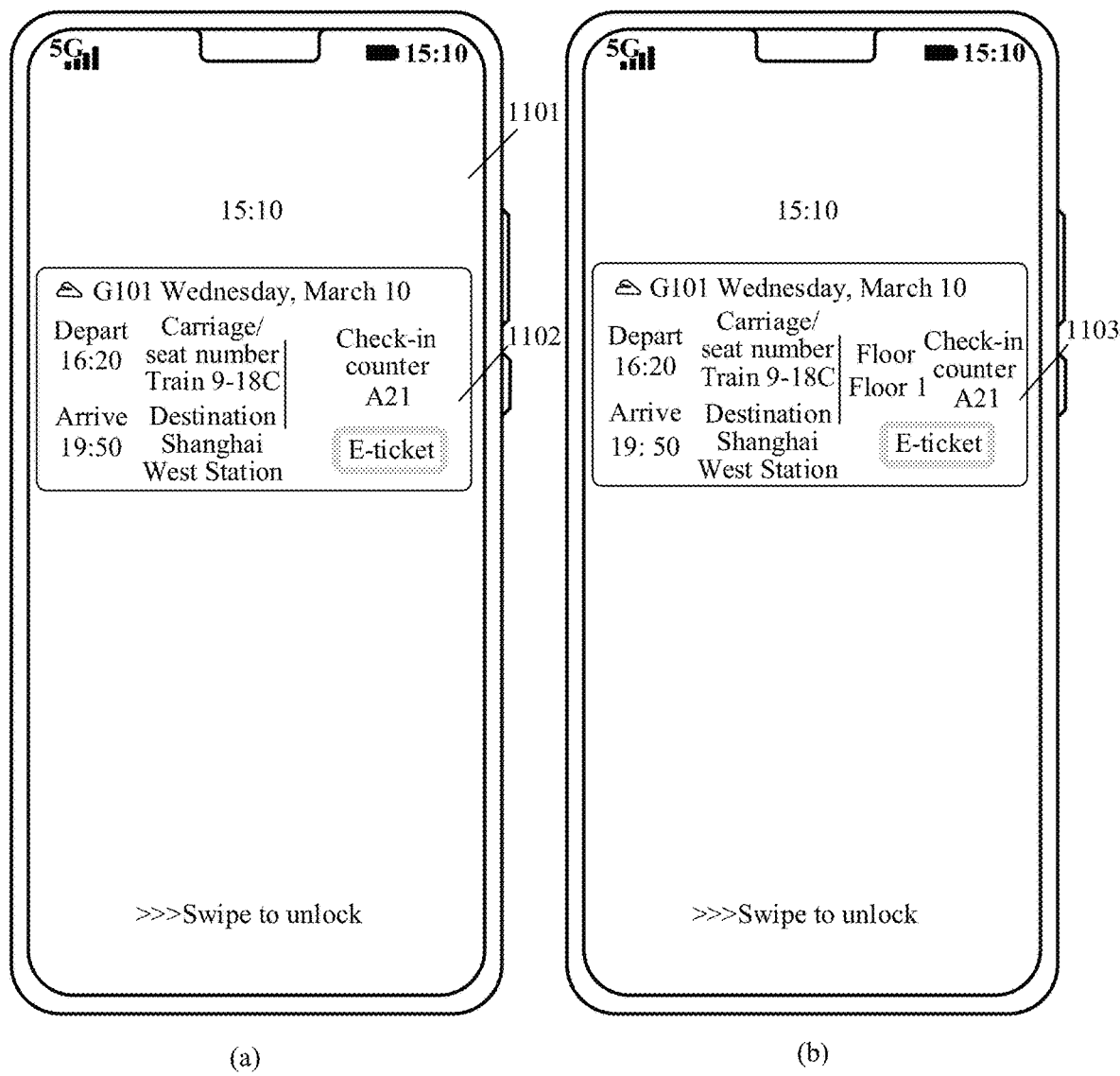
FIG. 11 is a schematic diagram of another lock screen interface according to an embodiment of this application.

Using an example in which the itinerary information is prompted through a lock screen interface, after detecting that the current location meets the preset condition 2, the mobile phone may display a lock screen interface 1101 shown in part (a) of FIG. 11. The lock screen interface 1101 includes a lock screen notification 1102. The lock screen notification 1102 displays the itinerary information 2.

In some embodiments, the itinerary information 2 includes check-in counter information. In this way, it is convenient for the user to quickly learn the check-in counter during the waiting stage. For example, the itinerary information shown in part (a) of FIG. 11 includes the check-in counter A21.

In some other embodiments, the itinerary information 2 further includes floor information. The floor information is used for indicating a floor on which the check-in counter of the itinerary 1 is located. In a large-scale railway station, the waiting hall usually includes a plurality of floors. Therefore, the waiting floor is also something that the user urgently needs to learn after entering the waiting hall. In this embodiment, the floor information is prompted, thereby facilitating the user to quickly learn the waiting floor. For example, the itinerary information 2 is displayed in a lock screen notification 1103 in the lock screen interface shown in part (b) of FIG. 11. The itinerary information 2 includes a check-in counter A21 and a floor 1.

In some other embodiments, the itinerary information 2 further includes one or more of: train number information, departure time, arrival time, carriage information, seat number information, departure station information, and/or destination station information. In this way, it is convenient for the user to associate the floor and/or check-in counter with the corresponding itinerary, thereby facilitating the user to confirm the information in diverse ways. For example, after arriving at the check-in counter, the user checks whether the train number information displayed on the display screen of the check-in counter is consistent with the train number information in the itinerary information 2. Likewise, in this embodiment of this application, the arrival time may be a scheduled arrival time or an adjusted arrival time.

In some other embodiments, similar to the circumstance in the stage of arriving at the departure station, the itinerary information 2 may further include prompt information 1. The prompt information 1 is used as a prompt to access the e-ticket. The prompt information 1 may be a prompt text, a prompt control, or the like to prompt the user with a quick access to the e-ticket. In other words, the prompt information can be used for triggering the mobile phone to display the e-ticket. For example, the prompt control is a prompt button "E-ticket" included in the itinerary information 2 shown in part (a) of FIG. 11 and part (b) of FIG. 11. The prompt control is also referred to as a first control.

Conversely, if it is detected that the current location and/or the itinerary status meets the preset condition 2, it indicates that the user is not in the waiting stage. In this case, the mobile phone does not actively prompt the user with the itinerary information 2. Instead, the mobile phone continues to detect whether the current location of the user and/or the itinerary status meets the preset condition 2.

Stage 3 is a check-in stage. Upon arrival of the check-in time, the user checks in to enter the platform. The check-in stage is a stage from arrival of the check-in time to completion of check-in. In the check-in stage, the e-ticket needs to be prompted to the user so that the user can show the e-ticket and let the QR code (e-ticket) be scanned and inspected.

Manner I: The mobile phone may quickly display the e-ticket in response to an operation performed by the user on the itinerary information 2. In Manner I, the itinerary information displaying method further includes step S603.

S603. The mobile phone displays the e-ticket in response to the operation 1 performed by the user on the itinerary information 2.

Before step S603, the mobile phone may receive the operation 1 performed by the user on the itinerary information 2. The operation 1 may be a tap operation or touch-and-hold operation performed by the user on the itinerary information 2. Alternatively, the operation 1 is a preset gesture. In the following embodiments, the technical solution of this application is described by using an example in which the operation 1 is a tap operation on the prompt control in the itinerary information 2. The operation 1 is also referred to as a first operation.

As an example, the prompt control is a prompt button "E-ticket" shown in part (a) of FIG. 11. The mobile phone may receive the tap operation performed by the user on the prompt button "E-ticket". In response to the tap operation, the mobile phone may display a ticket interface 1201 shown in FIG. 12. The ticket interface includes an e-ticket. The e-ticket may be used for check-in at the station.

In Manner I, the mobile phone may display the e-ticket in response to the operation performed by the user on the itinerary information 2 prompted in the waiting stage. This avoids the need to detect whether the user is in the check-in stage, and avoids the need to re-prompt relevant information for the check-in stage, thereby effectively reducing the power consumption of the mobile phone.

In practice, after viewing the itinerary information 2, the user may close the itinerary information 2. Subsequently, it is not convenient to quickly trigger the display of the e-ticket. For example, if the user closes the lock screen notification 1102 after viewing the itinerary information 2 in the lock screen notification 1102 in the lock screen interface 1101 shown in part (a) of FIG. 11, the user is unable to quickly trigger the display of the e-ticket. In view of this, this embodiment of this application further provides the following Manner II.

Figure 13:
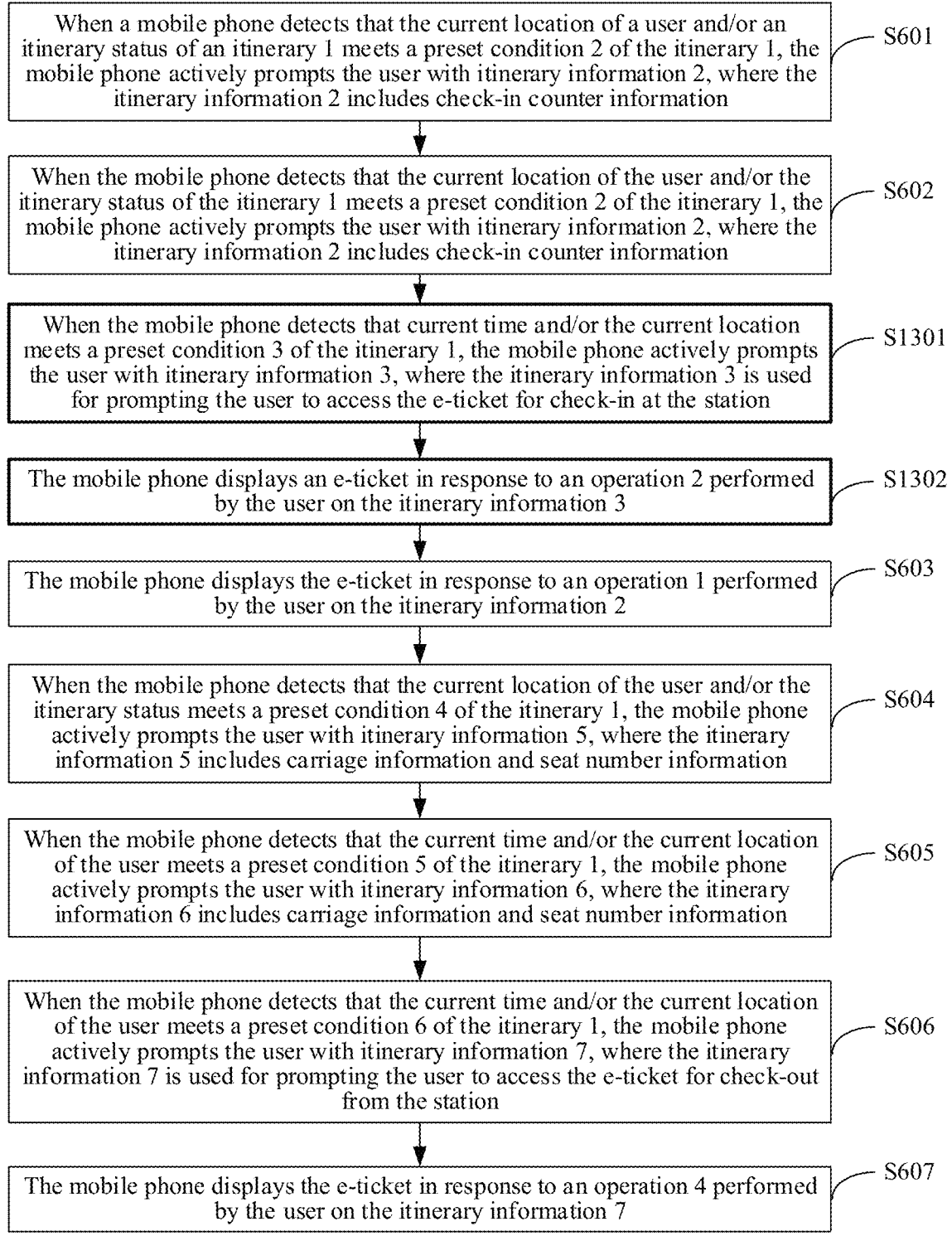
FIG. 13 is a flowchart of another itinerary information prompting method according to an embodiment of this application.

Manner II: The mobile phone needs to detect whether the user is in the check-in stage, and re-prompts the relevant information for the check-in stage, so as to trigger the display of the e-ticket. Specifically, as shown in FIG. 13, in Manner II, the itinerary information displaying method further includes steps S1301 and S1302.

S1301. When the mobile phone detects that the current time and/or current location meets a preset condition 3 of the itinerary 1, the mobile phone actively prompts the user with the itinerary information 3. The itinerary information 3 is used for prompting the user to access the e-ticket for check-in at the station.

The itinerary information 3 is also referred to as sixth information.

In some embodiments, before step S1301, the mobile phone may obtain the departure time of the itinerary 1, and calculate the check-in time based on the departure time. For example, if the check-in time is 15 minutes before the departure time, the check-in time is obtained by subtracting 15 minutes from the departure time. Alternatively, the mobile phone may directly obtain the check-in time. Subsequently, the mobile phone detects whether the current time reaches the start time of a preset time period 2. The start time of the preset time period 2 may be the check-in time, or, the start time of the preset time period 2 is earlier than the check-in time and is apart from the check-in time by a time interval 2. For example, the preset time period 2 starts at 5 minutes before the check-in time, and ends at the time of stopping the check-in. If the current time reaches the start time of the preset time period 2, the current time meets the preset condition 3, indicating that the user is about to enter the check-in stage. The preset time period 2 is also referred to as a second preset time period.

The check-in time may be a scheduled check-in time. If the check-in time is adjusted, the adjusted check-in time prevails. In this way, it is ensured that the time for the user to enter the check-in stage can be accurately detected.

As an example, for an itinerary of train number G101 from Beijing South to Shanghai West, the scheduled check-in time is 16:00, and a preset time 2 is a time point that is 5 minutes before the check-in time, that is, 15:55. After the user enters the waiting hall, the mobile phone starts to detect whether the current time reaches 15:55. If the current time is 15:50, due to the train being delayed, the server adjusts the check-in time to 16:20. The mobile phone may obtain the adjusted check-in time 16:15 from the server. Subsequently, the mobile phone detects whether the current time reaches 16:15 instead of still detecting whether the current time reaches 15:55.

In some embodiments, before step S1301, the mobile phone may detect whether the current location of the user falls within a location range close to the turnstile machine inside the waiting hall. For example, the mobile phone may detect whether the current location of the user is 3 meters distant from the turnstile machine in the waiting hall. If the current location of the user falls within the location range close to the turnstile machine inside the waiting hall, it indicates that the user is about to check in and the current location meets a preset condition 3.

In a specific implementation, the detection may be performed with reference to the current location and the current time. For example, the mobile phone detects whether the current time reaches the preset time 2 and detects whether the current location of the user falls within a location range close to the turnstile machine in the waiting hall. If the current time has reached the preset time 2 and the current location of the user falls within the location range close to the turnstile machine in the waiting hall, the preset condition 3 is met. In this way, the check-in requirements of the user can be recognized accurately.

If the mobile phone detects that the current time and/or current location meets the preset condition 3, the mobile phone actively prompts the user with the itinerary information 3.

Figure 14:
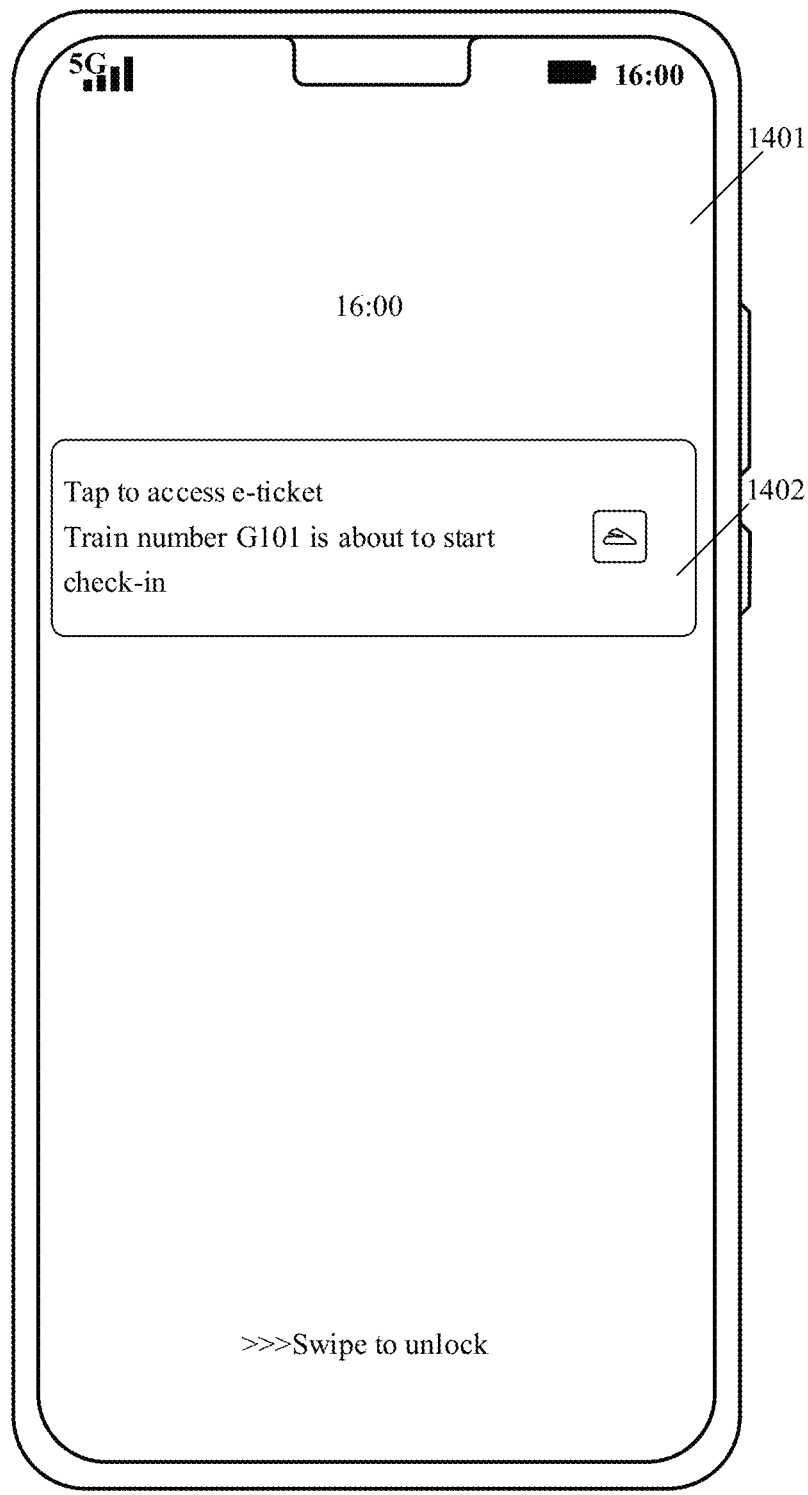
FIG. 14 is a schematic diagram of another lock screen interface according to an embodiment of this application.

Using an example in which the itinerary information is prompted through a lock screen interface, after detecting that the current time and/or current location meets the preset condition 3, the mobile phone may display a lock screen interface 1401 shown in FIG. 14. The lock screen interface 1401 includes a lock screen notification 1402. The lock screen notification 1402 displays the itinerary information 3.

In some embodiments, the itinerary information 3 includes a prompt text and/or a prompt control to prompt the user to access the e-ticket for check-in at the station. For example, the itinerary information 3 shown in FIG. 14 includes a prompt text "Tap to access e-ticket".

In some other embodiments, the itinerary information 3 further includes prompt information 2. The prompt information 2 is used for prompting start of check-in. For example, the prompt information 2 may be a prompt text "Train number G101 is about to start check-in" in the itinerary information 3 shown in FIG. 14.

Conversely, if the mobile phone detects that the current time and/or current location does not meet the preset condition 3, it indicates being too early for check-in, and the mobile phone does not actively prompt the user with the itinerary information 3 at this time. Instead, the mobile phone continues to detect whether the current time and/or current location meet the preset condition 3.

S1302. The mobile phone displays the e-ticket in response to the operation 2 performed by the user on the itinerary information 3.

The operation 2 is also referred to as a fourth operation.

The operation 2 may be a tap operation or a touch-and-hold operation performed by the user on the itinerary information 3, or the operation 2 may be a preset gesture.

For specific implementation of step S1302, reference may be made to the description of step S603 above, and details are omitted here.

In Manner II, when it is detected that the check-in stage is about to come, the electronic device re-prompts the relevant information for the check-in stage, so as to trigger the display of the e-ticket. In this way, it is ensured that the e-ticket can be displayed quickly as triggered. For example, after the user closes the itinerary information 2, the e-ticket can still be displayed as triggered through the itinerary information 3.

In Manner I and Manner II above, the display of the e-ticket needs to be triggered by the user. In view of this, this embodiment of this application further provides the following Manner III.

Manner III: The mobile phone displays the e-ticket directly upon detecting that the user is about to enter the check-in stage. Specifically, in Manner III, when the mobile phone detects that the current time and/or current location meets a preset condition 3, the mobile phone actively prompts the user with itinerary information 4. The itinerary information 4 includes the e-ticket. In this way, the mobile phone can actively display the e-ticket to the user to provide a more convenient access to the e-ticket.

Figure 12:
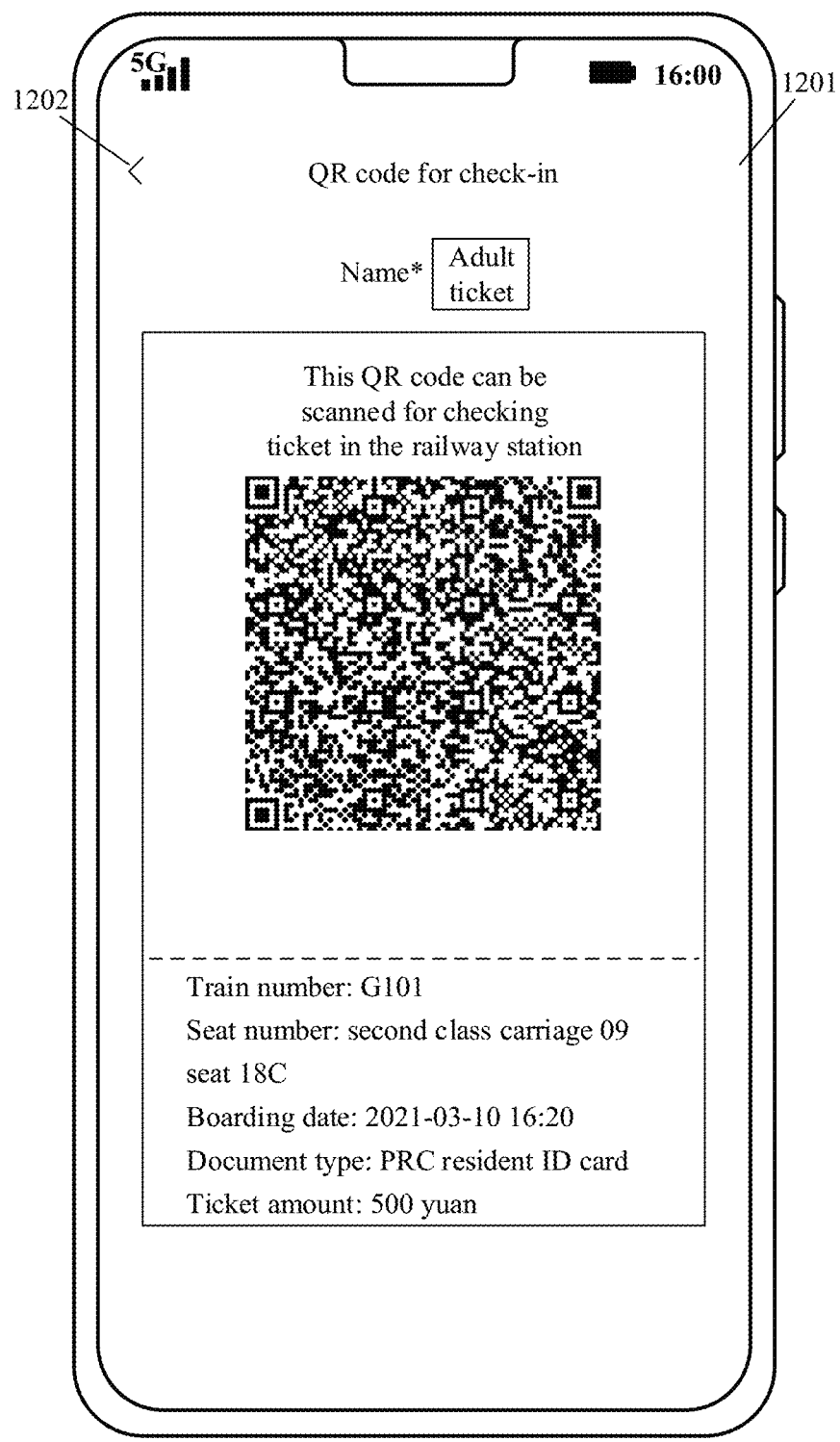
FIG. 12 is a schematic diagram of an e-ticket according to an embodiment of this application.

As an example, when the mobile phone detects that the current time meets the preset condition 3, the mobile phone may display a ticket interface 1201 shown in FIG. 12. The ticket interface 1201 includes an e-ticket. The e-ticket may be used for scanning a QR code to inspect the ticket.

Stage 4 is a boarding stage. Upon completion of check-in, the user enters a platform and is ready to board the train. The boarding stage is a stage from the completion of check-in to boarding and seating. In the boarding stage, the information such as the carriage number and seat number needs to be prompted to the user so that the user can board the train and be seated.

S604. When the mobile phone detects that the current location of the user and/or the itinerary status meets a preset condition 4 of the itinerary 1, the mobile phone actively prompts the user with itinerary information 5. The itinerary information 5 includes carriage information and seat number information.

The itinerary information 5 is also referred to as third information.

If the current location and/or itinerary status meets the preset condition 4, it indicates that the user is ready to get on the train after check-in, and is in the boarding stage. For example, if the itinerary status is a checked-in state, the preset condition 4 is met.

In some embodiments, before step S604, the mobile phone may detect whether the itinerary status meets a preset condition 4.

After detecting that the user enters the waiting hall or after arrival of the check-in time, the mobile phone can monitor whether the itinerary status is a state 2. The state 2 is used for indicating that the user has completed the check-in. If the itinerary status is the state 2, it indicates that the user is going to the platform to get on the train after completion of check-in. In other words, the e-ticket has been checked in at the station. Therefore, the itinerary status meets the preset condition 4. The state 2 is also referred to as a second state.

Specifically, after the user presents the e-ticket to a scanning region of the check-in turnstile machine, the server sends a check-in success message to the turnstile machine if succeeding in checking the ticket. Upon receiving the check-in success message, the turnstile machine opens the entrance to let the user enter the platform and be ready for boarding. At this time, the server updates the itinerary status corresponding to the e-ticket to the state 2. The mobile phone can obtain the itinerary status of the itinerary 1 by sending a status query request of the itinerary 1 to the server. If the server has updated the itinerary status of the itinerary 1 to the state 2, it can be found that the itinerary status is the state 2. Alternatively, after the itinerary status of the itinerary 1 is updated to the state 2, the server may send the itinerary status of the itinerary 2 to the mobile phone on which the itinerary 1 is ordered. In this way, the mobile phone can detect that the itinerary status of the itinerary 1 is updated to the state 2.

Figure 15:
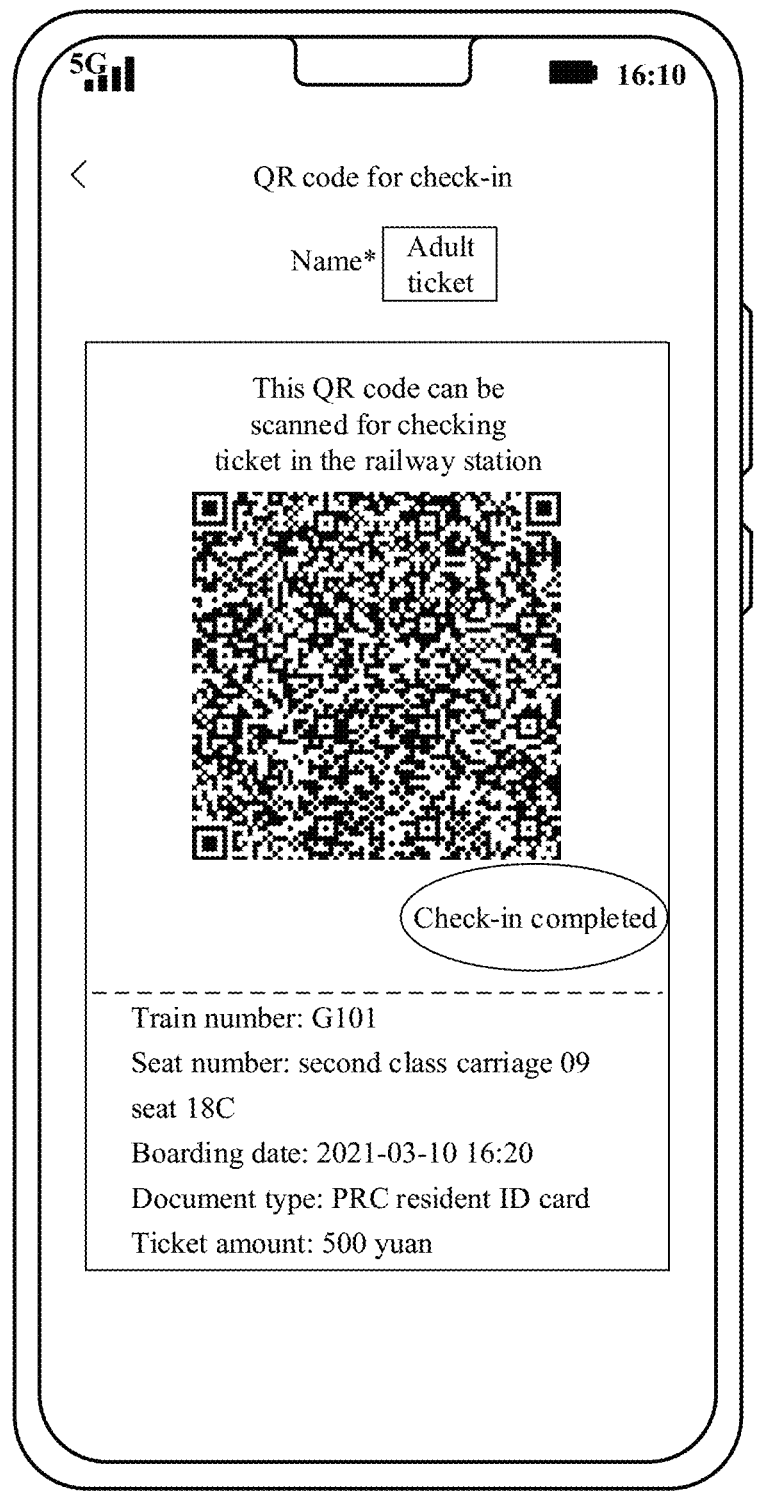
FIG. 15 is a schematic diagram of a check-in completion interface according to an embodiment of this application.

As an example, after the itinerary status of the itinerary 1 is updated to the state 2, the server may send the itinerary status of the itinerary 2 to the mobile phone on which the itinerary 1 is ordered. Subsequently, the mobile phone may identify the e-ticket with a "Checked in" label shown in FIG. 15 to indicate that the itinerary status has been updated to the state 2. Based on the "Checked in" label, the mobile phone can detect that the itinerary status is completion of check-in.

In other words, the mobile phone may receive status indication information from the server. The status indication information is used for indicating itinerary status of the itinerary 1. The second indication information is sent by the server to the mobile phone after the e-ticket is checked in at the station. Alternatively, after the mobile phone arrives at the departure station, the mobile phone may periodically obtain the itinerary status of the itinerary 1 from the server. The state 2 is sent to the mobile phone after the e-ticket is checked in at the station.

In the above embodiment, it is detected, based on the check-in status, whether the user has been checked in. The detection critically depends on the act of presenting and scanning the e-ticket for inspection. In an actual check-in scenario, for various reasons, the ticket may be inspected manually or by presenting other evidential documents. In this case, the e-ticket is not scanned, and the check-in status is unable to be learned in a timely and accurate manner.

In view of this, in some other embodiments, before step S604, the mobile phone may detect whether the current location of the user meets the preset condition 4.

After detecting that the user has entered the waiting hall or after arrival of the check-in time, through technologies such as geo-fencing, GPS, or Wi-Fi positioning, the mobile phone may detect whether the current location falls within a location range 3 of a route from the turnstile machine to the platform or falls within a location range 4 of the platform. If the current location falls within the location range 3, it indicates that the user has been checked in and on a route to the platform and is about to board the train. Therefore, the current location meets a preset condition 4. Alternatively, if the current location falls within the location range 4, it indicates that the user has been checked in and entered the platform and is about to board the train. Therefore, the current location meets the preset condition 4.

In a specific implementation, in order to improve the accuracy of the positioning result in an indoor environment, the current location may be determined by a Wi-Fi positioning technology. A Wi-Fi hotspot is available in a high-speed train carriage. On the route of the user from the waiting hall to the platform, the Wi-Fi signal of the high-speed train receivable by the mobile phone emerges and then becomes stronger. At the same time, the Wi-Fi signal in the waiting hall receivable by the mobile phone becomes weaker and then vanishes. Based on this, accurate positioning can be performed indoors.

It is hereby noted that, although, in the foregoing description, the detection as to whether the user has completed check-in is performed by monitoring the itinerary status and by using the positioning technologies such as geo-fencing, separately, the two manners may be combined for detection in practical implementation. In this way, the completion of check-in can be detected quickly and accurately in a case that the e-ticket is inspected by scanning. At the same time, the completion of check-in can also be detected in a case that the ticket is inspected in other ways.

If it is detected that the current location and/or the itinerary status meets the preset condition 4 (that is, the condition in step S604), it indicates that the user is going to the platform after completion of check-in, that is, is in a boarding stage. In this case, the mobile phone actively prompts the user with itinerary information 5.

Figure 16:
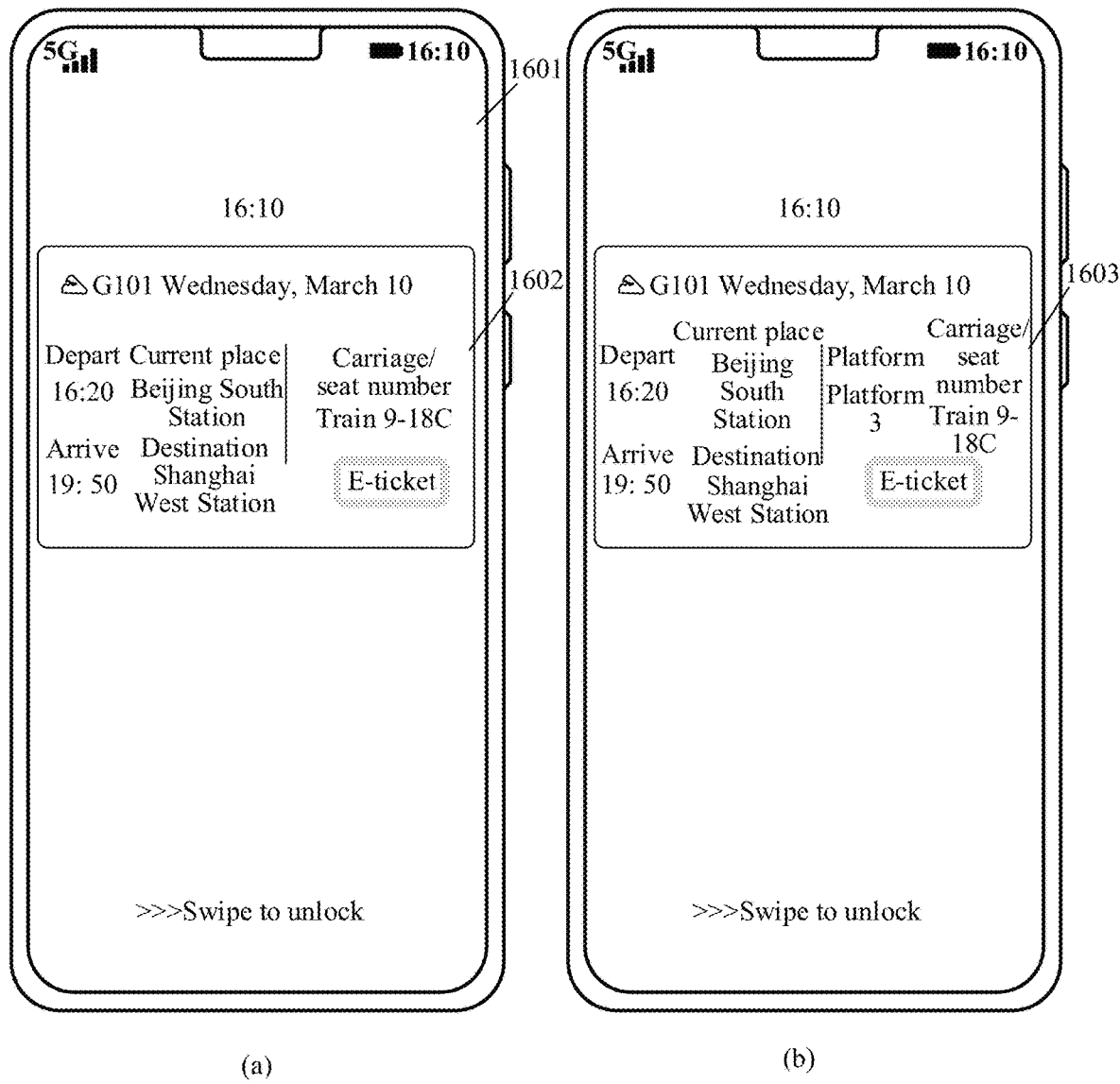
FIG. 16 is a schematic diagram of another lock screen interface according to an embodiment of this application.

Using an example in which the itinerary information is prompted through a lock screen interface, after detecting that the current location meets the preset condition 4, the mobile phone may display a lock screen interface 1601 shown in part (a) of FIG. 16. The lock screen interface 1601 includes a lock screen notification 1602. The lock screen notification 1602 includes the itinerary information 5.

In some embodiments, the itinerary information 5 includes carriage information and a seat number. For example, the itinerary information 5 shown in part (a) of FIG. 16 includes a carriage number 9 and a seat number 18C. In this way, it is convenient for the user to quickly obtain the carriage information and the seat number before getting on the train.

In some other embodiments, the itinerary information 5 further includes platform information. The platform information is used for indicating a boarding platform of the itinerary 1. For example, the itinerary information 5 in the lock screen notification 1603 in the lock screen interface shown in part (b) of FIG. 16 includes a carriage number 9, a seat number 18C, and a platform number 3. In this way, it is convenient for the user to quickly find the boarding platform after completion of check-in. Especially, for some railway stations with many platforms or complex locations of the platforms, the effect is more noticeable.

In some other embodiments, the itinerary information 5 further includes prompt information 1. The prompt information 1 is used as a prompt to access the e-ticket. For example, the itinerary information 5 shown in part (a) of FIG. 16 and part (b) of FIG. 16 includes an "E-ticket" button. The "E-ticket" button serves as a prompt to access the e-ticket here. In other words, the prompt information 1 is the "E-ticket" button.

In some other embodiments, the itinerary information 5 further includes one or more of train number, departure time, arrival time, departure station, or destination station, thereby facilitating the user to make a confirmation before boarding.

If it is detected that the current location does not meet the preset condition 4, it indicates that the user has not entered the boarding stage yet. In this case, the mobile phone does not actively prompt the user with the itinerary information 5. Instead, the mobile phone continues to detect whether the current location of the user meets the preset condition 4.

In the embodiment described above about the stage 4, the information such as carriage and seat number is prompted by prompting the itinerary information 5 after it is detected that the user has entered the boarding stage. In some other embodiments, in order to reduce calculations, the information such as carriage and seat number may be prompted in the following manner instead.

In these embodiments, the itinerary information 2 includes carriage information and seat number information. For example, the lock screen interface 1101 shown in part (a) of FIG. 11 includes a lock screen notification 1102. The lock screen notification 1102 displays the itinerary information 2. The itinerary information 2 includes not only the check-in counter number A21, but also the carriage number 9 and the seat number 18C. Through this itinerary information 2, the carriage number and seat number can be prompted.

Further, after the mobile phone displays the e-ticket in response to the operation 1 performed by the user on the itinerary information 2, the mobile phone may receive a preset operation performed by the user on the e-ticket. The mobile phone may display the itinerary information 2 in response to the preset operation (also referred to as a fifth operation). The preset operation may be a tap operation, a swipe left operation, a swipe right operation, or the like. For example, the e-ticket includes a return control. The preset operation may be a tap operation on the return control. In this way, it is convenient to continue to prompt the user with the carriage number and seat number after check-in.

In an example in which the return control is a control 1202 in an interface 1201 shown in FIG. 12, the preset operation may be a tap operation performed by the user on the control 1202. After the mobile phone displays the interface 1201 (including the e-ticket) in FIG. 12 in response to the operation 1 performed by the user on the itinerary information 2, the mobile phone may receive a tap operation performed by the user on the control 1202. In response to the tap operation by the user on the control 1202, the mobile phone may return to display the lock screen interface 1101 shown in part (a) of FIG. 11. The lock screen notification 1102 in the lock screen interface 1101 displays the itinerary information 2. The itinerary information 2 includes not only the check-in counter number A21, but also the carriage number 9 and the seat number 18C.

Stage 5 is an in-transit stage. After getting on the train, the user can move to the destination station along with the train. The in-transit stage means a stage from the user finding and taking a seat to disembarking.

In the in-transit stage, the user may leave the seat, for example, to go to the restroom or to the dining carriage. Subsequently, the user usually needs to check the carriage information and/or seat number information when returning to the seat. In view of this, in some embodiments, the mobile phone actively sends the information such as the carriage and seat number to the user during the in-transit stage. Specifically, the itinerary information displaying method further includes step S605.

S605. When the mobile phone detects that the current time and/or the current location of the user meets a preset condition 5 of the itinerary 1, the mobile phone actively prompts the user with itinerary information 6. The itinerary information 6 includes carriage information and seat number information.

The itinerary information 6 is also referred to as fifth information.

If the current time and/or the current location of the user meets the preset condition 5, it indicates that the user has entered the carriage and is in the in-transit stage.

In some embodiments, before step S605, the mobile phone may detect whether the current time meets the preset condition 5.

The mobile phone may detect whether the current time reaches a preset time 3. If the current time reaches the preset time 3, it indicates that the user has entered the carriage and has been seated, thereby detecting that the current location meets the preset condition 5.

The preset time 3 may be a departure time. For example, if the departure time is 16:20, the preset time 3 is 16:20. Generally, when the departure time arrives, the user has found his/her seat. In this way, based on the departure time, it can be quickly detected whether the current time meets the preset condition 5.

Alternatively, the preset time 3 may be later than the departure time, and may be apart from the departure time by a time interval 3. For example, the preset time 3 is a time point that is 10 minutes later than the departure time. That is, the time interval 3 is 10 minutes. By reserving the time length 3 for the user, it can be ensured that the user has found his/her own seat when the preset time 3 arrives, thereby improving the accuracy of detecting the in-transit stage.

In practice, exceptions such as the user missing the train or the train being delayed may occur. In other words, it is possible that the user has not entered the carriage when the departure time arrives. In view of this, in some other embodiments, before step S605, the mobile phone may detect whether the current location meets a preset condition 5.

In a specific implementation, the mobile phone may detect, through a low-power sensing technology, whether the current location is in the carriage. If the current location is in the carriage, it is detected that the current location meets the preset condition 5.

Specifically, the mobile phone uses the low power perception technology to determine the place of the user based on a combination of information such as sound, camera, GPS, Cell ID, Wi-Fi fingerprinting. For example, the place may be on a roadside, in a carriage, or in a plane. If the sensing result shows that the user is in the carriage, the preset condition 5 is met. In this implementation, through the low-power sensing technology, the satisfaction of the preset condition 5 is determined depending on whether the user is in the carriage, so as to avoid obtaining an incorrect detection result in an exceptional circumstance, and in turn, improve the rationality of the detection result indicating the in-transit stage. The low-power sensing technology may be regarded as a model for identifying a place, and is also referred to as a first sensing model. The first sensing model serves a function of recognizing the place of the mobile phone based on an ambient sound, an image (such as a raw image) acquired by a camera, GPS positioning, positioning by a base station, and/or Wi-Fi fingerprint information. During the recognition, the mobile phone may run the first sensing model by using the ambient sound, the image (such as a raw image) acquired by a camera, GPS positioning, positioning by a base station, and/or the Wi-Fi fingerprint information as an input, so as to output the place of the mobile phone. For example, the place may be any one of the departure station, the carriage, the destination station, or the like.

As an example, the mobile phone may detect, through a low-power visual sensing technology (a type of low-power sensing technology), whether the current location is in the carriage. Low-power vision is a solution to storing a camera-captured raw image in a Trusted Execution Environment (Trusted Execution Environment, TEE) and determining features of the image. The low-power vision solution can recognize the location of the user at the right time with reference to the scenario, time, and the like. If the sensing result shows that the user is in the carriage, the preset condition 5 is met. The entire process of detection using the low-power visual sensing technology occurs purely on the device rather than in the cloud, without storing data or results. In this way, the location recognition service is provided at the same time as ensuring security of user data.

In another specific implementation, the mobile phone may determine the current location through Wi-Fi positioning, Bluetooth positioning, or other technologies. Subsequently, the mobile phone detects whether the current location falls within a location range 5 of the carriage. If the current location falls within the location range 5, the current location meets the preset condition 5. For example, a Wi-Fi hotspot is provided in the train carriage. If the mobile phone can receive the Wi-Fi signal and the strength of the Wi-Fi signal exceeds a preset strength value, it indicates that the user is in the carriage. Similarly, this implementation can also avoid obtaining an incorrect detection result in an exceptional circumstance, and in turn, improve the rationality of the detection result indicating the in-transit stage.

If the mobile phone detects that the current time and/or current location meets the preset condition 5, it indicates that the user is in the in-transit stage. Therefore, the mobile phone actively prompts the user with itinerary information 6.

Figure 17:
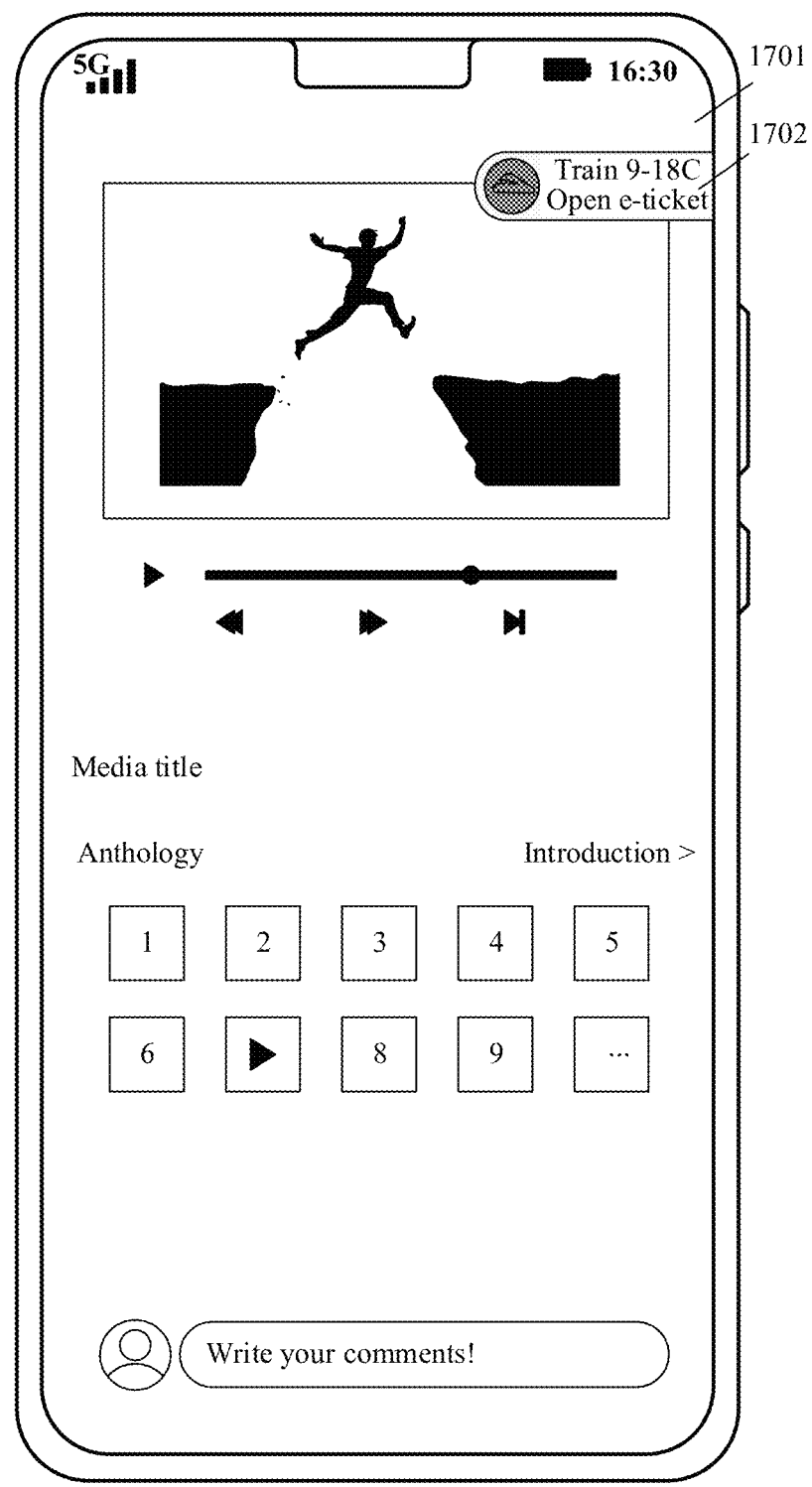
FIG. 17 is a schematic diagram of an app interface according to an embodiment of this application.

Using an example in which the itinerary information is prompted through a floating window, after detecting that the current location and/or current time meets the preset condition 5, the mobile phone may display an app interface 1701 of a video app shown in FIG. 17. The app interface 1701 includes a floating window 1702. The floating window 1702 displays the itinerary information 6.

The itinerary information 6 includes carriage information and seat number information. For example, the itinerary information 6 shown in FIG. 17 includes a carriage number 9 and a seat number 18C. In this way, if the user leaves the seat in the in-transit stage, the user can conveniently obtain the carriage number and seat number from the itinerary information 6.

It is hereby noted that in FIG. 17, the prompting of the itinerary information 6 is merely illustrated by using an example in which the floating window is displayed in the app interface. In practical implementation, the floating window may be displayed in any interface currently displayed on the mobile phone. For example, if the main interface is currently being displayed, the floating window may be displayed in the main interface. If the leftmost home screen interface is currently being displayed, the floating window may be displayed in the leftmost home screen interface. In this way, the mobile phone can always display the itinerary information 6 in an interface visible to the user, so that the itinerary information is easily accessible to the user.

Conversely, if it is detected that the current location and/or the current time does not meet the preset condition 5, it indicates that the user has not entered the in-transit stage. In this case, the mobile phone does not actively prompt the user with the itinerary information 6. Instead, the mobile phone continues to detect whether the current location and/or current time meets the preset condition 5.

Figure 18:
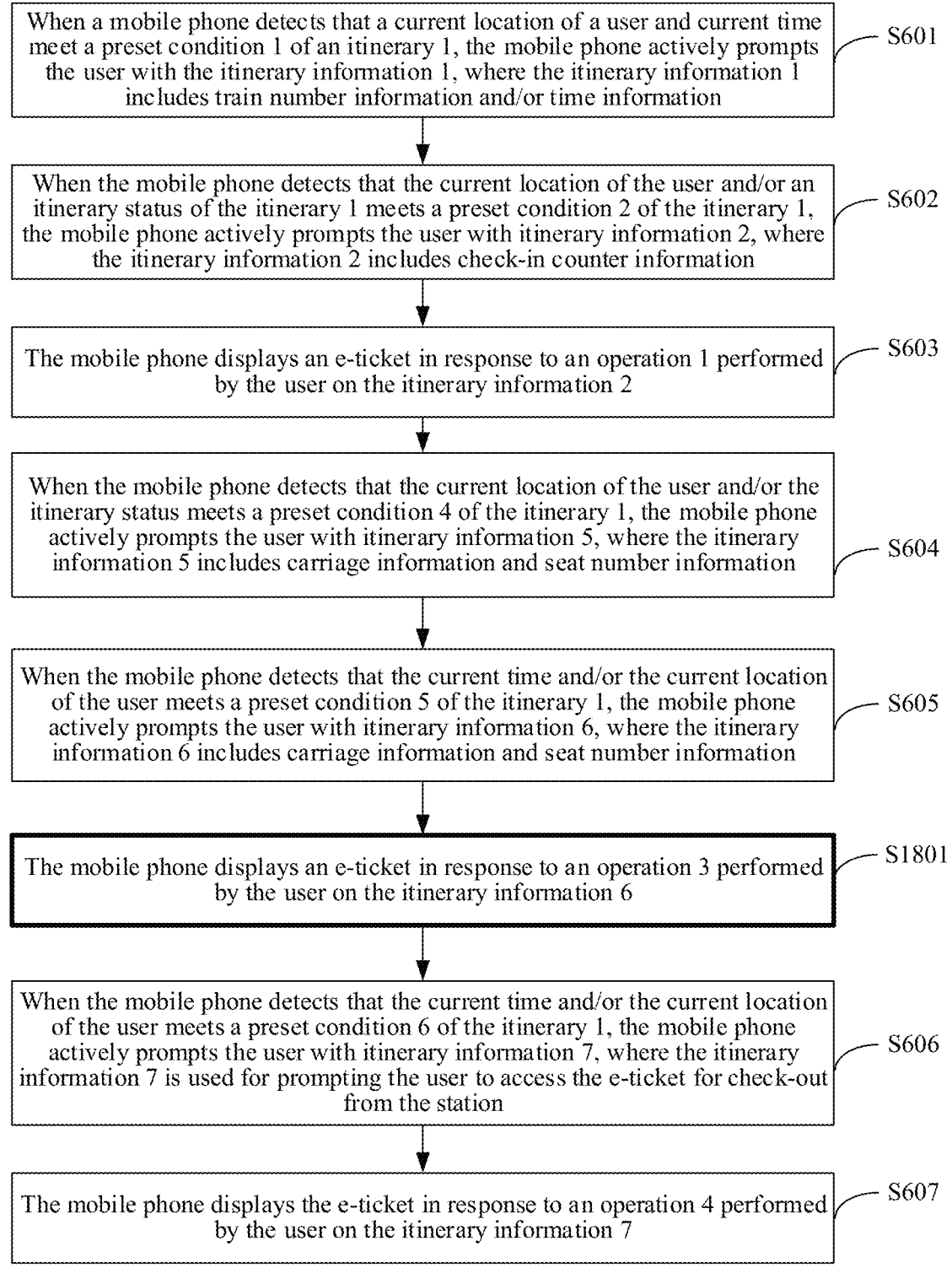
FIG. 18 is a flowchart of another itinerary information prompting method according to an embodiment of this application.

Further, during the in-transit stage, the train attendant may inspect the ticket irregularly. In view of this, as shown in FIG. 18, in some embodiments, the itinerary information prompting method further includes step S1801.

S1801. The mobile phone displays the e-ticket in response to an operation 3 performed by the user on the itinerary information 6.

The operation 3 may be a tap operation or touch-and-hold operation performed by the user on the itinerary information 6, or may be a preset gesture. The operation 3 is also referred to as a third operation.

For specific implementation of step S1801, reference may be made to the description of step S603 above, and details are omitted here. It is hereby noted that the e-ticket displayed by the mobile phone in response to the operation 3 is used for in-transit ticket inspection, but not for check-in at the station.

In this embodiment, the mobile phone can display the e-ticket based on the operation performed by the user on the itinerary information 6, thereby facilitating the user to easily cope with in-transit ticket inspection.

Stage 6 is an exit stage. After arriving at the destination station, the user gets off the train and exits the station. The exit stage is a stage from arrival at the destination station to check-out from the station. In the check-out stage, the e-ticket needs to be prompted to the user so that the user can check out from the station conveniently.

S606. When the mobile phone detects that the current time and/or the current location of the user meets a preset condition 6 of the itinerary 1, the mobile phone actively prompts the user with itinerary information 7. The itinerary information 7 is used for prompting the user to access the e-ticket for check-out from the station.

The itinerary information 7 is also referred to as fourth information.

If the current location meets the preset condition 6, it indicates that the user has arrived at the destination station and is in the exit stage.

In some embodiments, before step S606, the mobile phone may detect whether the current time meets the preset condition 6.

The mobile phone may detect, based on a preset time 4, whether the current location meets the preset condition 6. If the current time reaches the preset time 4, it indicates that the user has arrived at the destination station, thereby detecting that the current location meets the preset condition 6.

The preset time 4 may be an arrival time. For example, if the arrival time is 19:50, the preset time 4 may be 19:50. Usually, when the arrival time comes, the user needs to get off the train and exit the station. In this way, based on the arrival time, it can be quickly detected whether the current location meets the preset condition 6.

Alternatively, the preset time 4 may be later than the arrival time, and may be apart from the arrival time by a time interval 4. For example, the preset time 4 is a time point that is 3 minutes later than the arrival time. That is, the time interval 4 is 3 minutes. The reserved time interval 4 ensures reasonable timing of the user having got off the train and being ready to exit the station, thereby avoiding premature prompting of the itinerary information 7, and improving the rationality of the timing of prompting the itinerary information 7.

In practice, exceptions such as the train being delayed or arriving at the destination station ahead of schedule may occur. In other words, it is possible that the arrival time has come but the train has not arrived at the destination station; and it is also possible that the arrival time has not come yet but the train has arrived at the destination station. In view of this, in some other embodiments, before step S606, the mobile phone may detect whether the current location meets a preset condition 6, so as to avoid an incorrect detection in such exceptional circumstances as the train being delayed or arriving at the destination station ahead of schedule, and in turn, improve the rationality of a detection result indicating the exit stage.

In a specific implementation, the mobile phone may detect, through a low-power sensing technology, whether the current location is in the carriage. If the current location is not in the carriage, the current location meets the preset condition 6. For the detection using the low-power vision sensing technology, reference may be made to related description of step S605 above, and details are omitted here.

In another specific implementation, the mobile phone may detect, through geo-fencing, whether the current location falls within a location range 6 of the destination station. If the current location falls within the location range 6, the current location meets the preset condition 6.

In another specific implementation, the mobile phone may determine the current location through GPS, Wi-Fi positioning, Cell ID, or other technologies. If the current location falls within the location range 6 of the destination station, the current location meets the preset condition 6.

Similarly, the mobile phone may use a first sensing model to identify whether the place of the mobile phone is outside the carriage and in the destination station. If the place of the mobile phone is outside the carriage and in the destination station, the current location meets the preset condition 6.

If the mobile phone detects that the current time and/or current location meets the preset condition 6, it indicates that the user is in the exit stage. Therefore, the mobile phone actively prompts the user with itinerary information 7.

Figure 19:
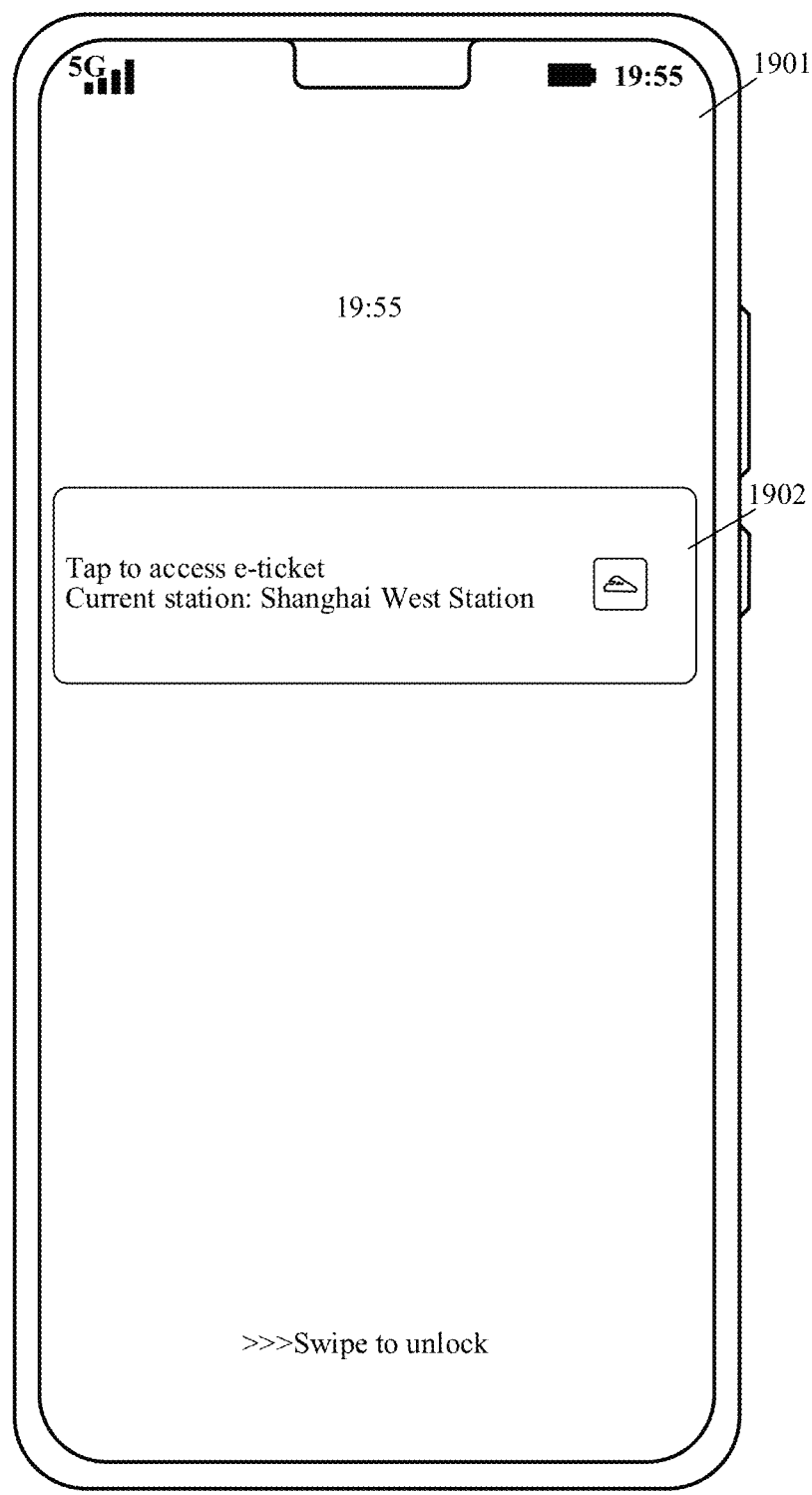
FIG. 19 is a schematic diagram of another lock screen interface according to an embodiment of this application.

Using an example in which the itinerary information is prompted through a lock screen interface, after detecting that the current location meets the preset condition 6, the mobile phone may display a lock screen interface 1901 shown in FIG. 19. The lock screen interface 1901 includes a lock screen notification 1902. The lock screen notification 1902 displays the itinerary information 7.

The itinerary information 7 includes a prompt text and/or a prompt control to prompt the user to access the e-ticket for check-out from the station. For example, the itinerary information 7 shown in FIG. 19 includes a prompt text "Tap to access e-ticket" to prompt the user with a quick access to the e-ticket.

Alternatively, the itinerary information 7 may further include destination station information to facilitate the user to confirm arrival at the destination station.

Conversely, if it is detected that the current location does not meet the preset condition 6, it indicates that the user has not entered the exit stage yet. In this case, the mobile phone does not actively prompt the user with the itinerary information 7. Instead, the mobile phone continues to detect whether the current location and/or current time meets the preset condition 6.

In the exit stage, upon arriving at an exit, the user needs to show the e-ticket and scan the QR code of the e-ticket through the turnstile machine. In view of this, in this embodiment of this application, the itinerary information prompting method further includes step S607.

S607. The mobile phone displays the e-ticket for check-out from the station in response to the operation 4 performed by the user on the itinerary information 7.

The operation 4 may be a tap operation or touch-and-hold operation performed by the user on the itinerary information 7, or may be a preset gesture. The operation 4 is also referred to as a second operation.

For specific implementation of step S607, reference may be made to the description of step S603 above, and details are omitted here.

In this embodiment, the mobile phone can display the e-ticket based on the operation performed by the user on the itinerary information 7, thereby facilitating the user to check out from the station.

In some other embodiments, when the mobile phone detects that the current time and/or the current location of the user meets a preset condition 6, the mobile phone may directly prompt the e-ticket. In this way, after the user exits the station, the user can access the e-ticket without performing any operation.

To sum up, by applying the method according to this embodiment of this application, the mobile phone can actively prompt the user with the itinerary information that matches each itinerary stage, so that the user can quickly obtain the itinerary information required in each itinerary stage, thereby reducing the difficulty of the user in obtaining the itinerary information, and providing travel convenience. For example, as shown in FIG. 1, after applying the method according to this embodiment of this application, the user needs to take out and scan the ID card to enter the station only when entering the station. In all subsequent stages such as the waiting stage, the check-in stage, the boarding stage, the in-transit stage, and the disembarking stage, the mobile phone actively prompts the user with pertinent itinerary information. In addition, the user can quickly access the e-ticket.

In the description above, just the conditions for triggering the display of the itinerary information of each stage are described. In some embodiments, for a first stage among the stages 1 to 6, after it is detected that the user enters a second stage, the itinerary information of the first stage is closed while the itinerary information of the second stage is displayed. The first stage is any one of stages 1 to 6, and the second stage is a next stage of the first stage. For example, after it is detected that the waiting stage (stage 2) begins, the itinerary information 1 displayed in the stage of arriving at the departure station (stage 1) is closed. In this way, only the itinerary information most desired by the user currently is prompted to the user, thereby preventing the user from being interfered with by the prompt information in the historical stages. In some other embodiments, the mobile phone closes the itinerary information upon receiving a closing operation (such as a swipe up operation or a swipe left operation) performed by the user on the currently displayed itinerary information. For example, the mobile phone may receive a swipe left operation performed by the user on a leftmost home screen notification 308 shown in FIG. 3D. The leftmost home screen notification 308 displays the itinerary information. In response to the swipe left operation, the mobile phone may close the leftmost home screen notification 308, thereby closing the itinerary information displayed in the leftmost home screen notification 308. In this way, the user is prevented from being interfered with during use of the mobile phone.

The detection and display of stages 1 to 6 are described above in sequence. However, in some embodiments, the detection and display may be performed for just a part of stages 1 to 6 in one itinerary. For example, only the waiting stage and the boarding stage are detected, the check-in counter information is displayed in the waiting stage, and the carriage information and seat number information are displayed in the boarding stage. For another example, only the stage of arriving at the departure station (that is, the stage before entry to the station) and the waiting stage (the stage after entry to the station) are detected, the train number information and time information are displayed in the stage of arriving at the departure station, and the check-in counter information, carriage information, and seat number information are displayed concurrently in the waiting stage. In this way, the power consumption of the mobile phone during the whole itinerary can be reduced, and the user is prevented from being interfered with by frequent information prompts during use of the mobile phone.

Finally, it is hereby noted that the itinerary information displayed in stages 1 to 6 usually can be sent to the mobile phone by a railway system (such as a server of 12306). For example, the railway system may send the itinerary information such as itinerary status and e-ticket to the mobile phone. Alternatively, the itinerary information may be found in the railway system by the mobile phone. In exceptional circumstances such as temporary adjustment of the information like the check-in counter, departure time, and check-in time of the itinerary 1, the departure station may be the first to grasp such information. In view of this, in some embodiments, the mobile phone may receive itinerary update information (such as updated check-in counter, departure time and/or check-in time) from a back end of the station to obtain the latest itinerary information.

Some other embodiments of this application provide an electronic device. The electronic device may include: the display screen (for example, a touchscreen), a memory, and one or more processors. The display screen, the memory, and the processor are coupled together. The memory is configured to store computer program code, and the computer program code includes a computer instruction. When the processor executes the computer instruction, the electronic device can perform each function or step performed by the mobile phone in the foregoing method embodiment. For the structure of the electronic device, reference may be made to the structure of the mobile phone 200 shown in FIG. 2.

Figure 20:
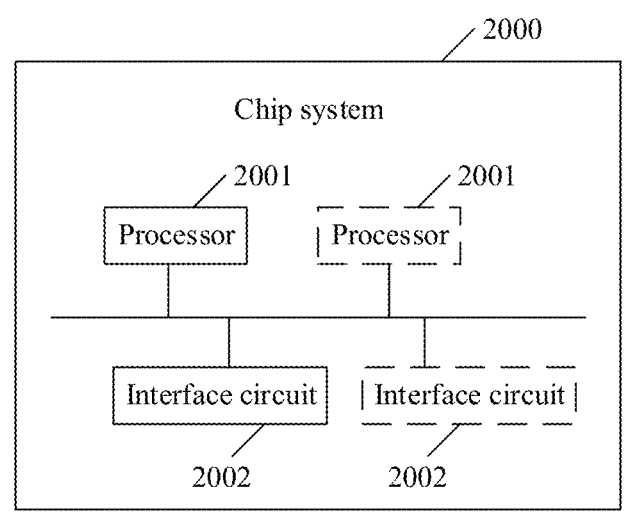
FIG. 20 is a schematic structural diagram of a chip system according to an embodiment of this application.

An embodiment of this application further provides a chip system. As shown in FIG. 20, the chip system 2000 includes at least one processor 2001 and at least one interface circuit 2002. The processor 2001 and the interface circuit 2002 may be connected by a line. In an example, the interface circuit 2002 may be configured to receive a signal from another apparatus (for example, a memory of the electronic device). For another example, the interface circuit 2002 may be configured to transmit a signal to another apparatus (for example, the processor 2001). For example, the interface circuit 2002 may read an instruction stored in the memory, and send the instruction to the processor 2001. When executed by the processor 2001, the instruction causes the electronic device to perform each step in the foregoing embodiment. The chip system may further include other discrete devices that are not particularly limited herein.

An embodiment of this application further provides a computer storage medium. The computer storage medium includes a computer instruction. When run on the electronic device, the computer instruction causes the electronic device to perform each function or step performed by the mobile phone in the foregoing method embodiment.

An embodiment of this application further provides a computer program product. When run on a computer, the computer program product causes the computer to perform each function or step performed by the mobile phone in the foregoing method embodiment.

From the description of the foregoing embodiments, a person skilled in the art clearly understands that, for ease and brevity of description, division into the foregoing function modules is used as an example for description. In practical applications, the foregoing functions may be allocated to different function modules as required. That is, an internal structure of an apparatus is divided into different function modules to perform all or some of the functions described above.

In the several embodiments provided in this application, it is to be understood that the disclosed apparatus and method may be implemented in other manners. For example, the described apparatus embodiment is merely an example. For example, the modules or units are just divided from a perspective of logical functions, and may be divided in other manners in practical implementation. For example, a plurality of units or components may be combined or integrated into another apparatus, or some features may be ignored or skipped. In addition, the mutual couplings or direct couplings or communication connections displayed or discussed herein may be indirect couplings or communication connections implemented through some interfaces, apparatuses, or units, and may be electronic, mechanical, or in other forms.

The units described as separate parts may be physically separated or not. Apart displayed as a unit may be one or more physical units, that is, may be located at the one position or distributed in different positions. Some or all of the units may be selected as actually required to achieve the objectives of the technical solutions hereof.

In addition, function units in each embodiment of this application may be integrated into one processing unit, or each of the units may exist alone physically, or two or more units may be integrated into one unit. The integrated unit may be implemented in a form of hardware or a software function unit.

When the integrated unit is implemented in the form of a software function unit and is sold or used as an independent product, the integrated unit may be stored in a readable storage medium. Based on such an understanding, the technical solutions in some embodiments of this application essentially, or the part contributing to the prior art, or all or a part of the technical solutions may be implemented in the form of a software product. The software product is stored in a storage medium and includes several instructions for instructing a device (a single-chip microcomputer, a chip, or the like) or a processor (processor) to perform all or some of the steps of the method described in each embodiment of this application. The foregoing storage medium includes any medium that can store program code, such as a USB flash drive, a removable hard disk, a read-only memory (read only memory, ROM), a random access memory (random access memory, RAM), a magnetic disk, a compact disc, or the like.

What is described above is merely specific embodiments of this application, but the protection scope of this application is not limited to such embodiments. Any and all variations or replacements made within the technical scope disclosed herein still fall within the protection scope of this application. Therefore, the protection scope of this application is subject to the protection scope of the claims.

What is claimed is:

1. An itinerary information prompting method, applied to an electronic device, wherein the method comprises:
    prompting, by a processor of an electronic device, first information when the electronic device arrives at a departure station of a first itinerary, wherein the first information comprises at least one of train number information of the first itinerary, departure time of the first itinerary, and check-in time of the first itinerary;
    prompting, by the processor of the electronic device, second information when itinerary status of the first itinerary is a first state, wherein the first state is used for indicating that a user corresponding to the first itinerary has entered the departure station through security check, and the second information comprises check-in counter information of the first itinerary;
    displaying, by the processor of the electronic device, an e-ticket of the first itinerary in response to a first operation performed by the user on the second information, wherein the e-ticket is used for check-in at the departure station;
    prompting, by the processor of the electronic device, third information after the itinerary status of the first itinerary is updated to a second state, wherein the second state is used for indicating that the e-ticket has been checked in at the departure station, and the third information comprises carriage information and seat number information;
    prompting, by the processor of the electronic device, fourth information when the electronic device arrives at a destination station of the first itinerary, wherein the fourth information is used for prompting the user to access the e-ticket for check-out from the destination station; and
    displaying, by the electronic device, the e-ticket in response to a second operation performed by the user on the fourth information, wherein the e-ticket is used for check-out from the destination station;
    displaying, by the processor of the electronic device, fifth information through a floating window when the electronic device enters the carriage information corresponding to the first itinerary, wherein the fifth information comprises the carriage information and the seat number information.

2. The method according to claim 1, wherein the third information further comprises platform information, and the platform information is used for indicating a boarding platform of the first itinerary.

3. The method according to claim 1, wherein the method further comprises:
    displaying, by the processor of the electronic device, the e-ticket in response to a third operation performed by the user on the fifth information, wherein the e-ticket is used for checking a ticket.

4. The method according to claim 1, wherein that the electronic device arrives at a departure station of a first itinerary comprises: a current location of the electronic device is located in a location range of the departure station of the first itinerary in a first preset time period; and
    a start time of the first preset time period is earlier than the departure time of the first itinerary.

5. The method according to claim 1, wherein the method further comprises:
    receiving, by the processor of the electronic device, status indication information from a server, wherein the status indication information is used for indicating itinerary status of the first itinerary; a first status indication information is sent by the server to the electronic device after the user of the first itinerary enters the departure station through security check, and a second status indication information is sent by the server to the electronic device after the e-ticket is checked in at the departure station; or
    obtaining, by the processor of the electronic device, the itinerary status of the first itinerary from the server periodically after the electronic device arrives at the departure station or after the check-in time arrives, wherein the first state is obtained by the electronic device after the user of the first itinerary enters the departure station through security check, and the second state is sent by the server to the electronic device after the e-ticket is checked in at the departure station.

6. The method according to claim 5, wherein the server is a server of a 12306™ app.

7. The method according to claim 1, wherein the second information further comprises floor information, and the floor information is used for indicating a floor on which the check-in counter of the first itinerary is located.

8. The method according to claim 1, wherein the second information further comprises a first control, the first control is used for triggering the electronic device to display the e-ticket, and the first operation is a tap operation on the first control.

9. The method according to claim 1, wherein the electronic device comprises a first sensing model; the first sensing model serves a function of recognizing a place of the electronic device based on at least one of an ambient sound, an image acquired by a camera, positioning by a Global Positioning System (GPS), positioning by a base station, and Wi-Fi fingerprint information; and the method further comprises:
running, by the processor of the electronic device, the first sensing model by using at least one of the ambient sound, the image acquired by the camera, the positioning by the GPS, the positioning by the base station, and the Wi-Fi fingerprint information as an input, so as to output the place of the electronic device, wherein
the place is any one of the departure station, a carriage, or the destination station.

10. The method according to claim 1, wherein the fourth information comprises destination station information.

11. The method according to claim 1, wherein the prompting, by an electronic device, first information, comprises:
displaying, by the processor of the electronic device, the first information in at least one of a leftmost home screen interface, a lock screen interface, a main interface, or a floating window; or, sending, by the electronic device, the first information to a wearable device connected to the electronic device so that the first information is available for being displayed or played by the wearable device; and
the prompting, by the processor of the electronic device, second information, comprises:
displaying, by the processor of the electronic device, the second information in at least one of the leftmost home screen interface, the lock screen interface, the main interface, or the floating window; or, sending, by the processor of the electronic device, the second information to the wearable device connected to the electronic device so that the second information is available for being displayed or played by the wearable device, wherein
the wearable device comprises at least one of a bracelet, a smartwatch, or a headset.

12. The method according to claim 1, wherein, after the prompting, by the electronic device, second information, the method further comprises:
prompting, by the processor of the electronic device, six information when current time reaches start time of a second preset time period, wherein the sixth information is used for prompting the user to access the e-ticket for check-in at the departure station, and the start time of the second preset time period is earlier than or equal to the check-in time of the first itinerary; and
displaying, by the processor of the electronic device, the e-ticket in response to a fourth operation performed by the user on the sixth information, wherein the e-ticket is used for check-in at the departure station.

13. The method according to claim 12, wherein the second information further comprises carriage information and seat number information; and
after displaying the e-ticket of the first itinerary, the method further comprises: displaying, by the processor of the electronic device, the second information in response to a fifth operation performed by the user on the e-ticket.

14. An electronic device, wherein the electronic device comprises a memory and a processor; the memory is coupled to the processor; the memory is configured to store computer program code, the computer program code comprises a computer instruction, and, when executed by the processor, the computer instruction causes the electronic device to perform:
prompting first information when the electronic device arrives at a departure station of a first itinerary, wherein the first information comprises at least one of train number information of the first itinerary, departure time of the first itinerary, and check-in time of the first itinerary;
prompting second information when itinerary status of the first itinerary is a first state, wherein the first state is used for indicating that a user corresponding to the first itinerary has entered the departure station through security check, and the second information comprises check-in counter information of the first itinerary;
displaying an e-ticket of the first itinerary in response to a first operation performed by the user on the second information, wherein the e-ticket is used for check-in at the departure station;
prompting third information after the itinerary status of the first itinerary is updated to a second state, wherein the second state is used for indicating that the e-ticket has been checked in at the departure station, and the third information comprises carriage information and seat number information;
prompting fourth information when the electronic device arrives at a destination station of the first itinerary, wherein the fourth information is used for prompting the user to access the e-ticket for check-out from the destination station; and
displaying the e-ticket in response to a second operation performed by the user on the fourth information, wherein the e-ticket is used for check-out from the destination station;
displaying fifth information through a floating window when the electronic device enters the carriage information corresponding to the first itinerary, wherein the fifth information comprises the carriage information and the seat number information.

15. A non-transitory computer-readable storage medium, wherein the computer-readable storage medium stores an instruction, and, when executed by a processor of an electronic device, the instruction causes the electronic device to perform:
prompting first information when the electronic device arrives at a departure station of a first itinerary, wherein the first information comprises at least one of train number information of the first itinerary, departure time of the first itinerary, and check-in time of the first itinerary;

prompting second information when itinerary status of the first itinerary is a first state, wherein the first state is used for indicating that a user corresponding to the first itinerary has entered the departure station through security check, and the second information comprises check-in counter information of the first itinerary;

displaying an e-ticket of the first itinerary in response to a first operation performed by the user on the second information, wherein the e-ticket is used for check-in at the departure station;

prompting third information after the itinerary status of the first itinerary is updated to a second state, wherein the second state is used for indicating that the e-ticket has been checked in at the departure station, and the third information comprises carriage information and seat number information;

prompting fourth information when the electronic device arrives at a destination station of the first itinerary, wherein the fourth information is used for prompting the user to access the e-ticket for check-out from the destination station; and displaying the e-ticket in response to a second operation performed by the user on the fourth information, wherein the e-ticket is used for check-out from the destination station;

displaying fifth information through a floating window when the electronic device enters the carriage information corresponding to the first itinerary, wherein the fifth information comprises the carriage information and the seat number information.

16. The electronic device according to claim 14, wherein the prompting, by an electronic device, first information, comprises:

displaying the first information in at least one of a leftmost home screen interface, a lock screen interface, a main interface, or a floating window; or, sending the first information to a wearable device connected to the electronic device so that the first information is available for being displayed or played by the wearable device; and the prompting, by the electronic device, second information, comprises:

displaying the second information in at least one of the leftmost home screen interface, the lock screen interface, the main interface, or the floating window; or, sending the second information to the wearable device connected to the electronic device so that the second information is available for being displayed or played by the wearable device, wherein the wearable device comprises at least one of a bracelet, a smartwatch, or a headset.

17. The electronic device according to claim 14, wherein the third information further comprises platform information, and the platform information is used for indicating a boarding platform of the first itinerary.

18. The electronic device according to claim 14, wherein that the electronic device arrives at the departure station of a first itinerary comprises: a current location of the electronic device is located in a location range of the departure station of the first itinerary in a first preset time period; and a start time of the first preset time period is earlier than the departure time of the first itinerary.

19. The electronic device according to claim 14, wherein when executed by the processor, the computer instruction causes the electronic device to perform:

receiving status indication information from a server, wherein the status indication information is used for indicating itinerary status of the first itinerary; a first status indication information is sent by the server to the electronic device after the user of the first itinerary enters the departure station through security check, and a second status indication information is sent by the server to the electronic device after the e-ticket is checked in at the departure station; or obtaining the itinerary status of the first itinerary from the server periodically after the electronic device arrives at the departure station or after the check-in time arrives, wherein the first state is obtained by the electronic device after the user of the first itinerary enters the departure station through security check, and the second state is sent by the server to the electronic device after the e-ticket is checked in at the departure station.

20. The electronic device according to claim 14, wherein the electronic device comprises a first sensing model; the first sensing model serves a function of recognizing a place of the electronic device based on at least one of an ambient sound, an image acquired by a camera, positioning by a Global Positioning System (GPS), positioning by a base station, and Wi-Fi fingerprint information; and when executed by the processor, the computer instruction causes the electronic device to perform:

running the first sensing model by using at least one of the ambient sound, the image acquired by the camera, the positioning by the GPS, the positioning by the base station, and the Wi-Fi fingerprint information as an input, so as to output the place of the electronic device, wherein the place is any one of the departure station, a carriage, or the destination station.

* * * * *